(12) United States Patent
Yazdanbod

(10) Patent No.: US 9,309,133 B2
(45) Date of Patent: Apr. 12, 2016

(54) APPARATUS AND PROCESS FOR SEPARATION AND SELECTIVE RECOMPOSITION OF IONS

(71) Applicant: Azaroghly Yazdanbod, Calgary (CA)

(72) Inventor: Azaroghly Yazdanbod, Calgary (CA)

(73) Assignee: Ionic Solutions Ltd., Rancho Mirage, CA (US)

( * ) Notice: Subject to any disclaimer, the term of this patent is extended or adjusted under 35 U.S.C. 154(b) by 63 days.

(21) Appl. No.: 14/221,396

(22) Filed: Mar. 21, 2014

(65) Prior Publication Data
US 2014/0202861 A1   Jul. 24, 2014

Related U.S. Application Data

(63) Continuation of application No. 13/278,983, filed on Oct. 21, 2011, now Pat. No. 8,715,477.

(60) Provisional application No. 61/455,516, filed on Oct. 22, 2010, provisional application No. 61/572,413, filed on Jul. 18, 2011.

(51) Int. Cl.
| B01D 57/00 | (2006.01) |
| C02F 1/469 | (2006.01) |
| C25B 1/00 | (2006.01) |
| B01D 61/44 | (2006.01) |
| B01D 61/46 | (2006.01) |
| B01D 61/50 | (2006.01) |
| B01D 61/52 | (2006.01) |
| B01D 61/54 | (2006.01) |
| C02F 1/46 | (2006.01) |
| B01D 57/02 | (2006.01) |

(52) U.S. Cl.
CPC .............. *C02F 1/4695* (2013.01); *B01D 57/02* (2013.01); *B01D 61/44* (2013.01); *B01D 61/46* (2013.01); *B01D 61/50* (2013.01); *B01D 61/52* (2013.01); *B01D 61/54* (2013.01); *C02F 1/4604* (2013.01); *C02F 1/4691* (2013.01); *C25B 1/00* (2013.01); *B01D 2311/2684* (2013.01); *C02F 2201/4611* (2013.01); *C02F 2201/4616* (2013.01); *C02F 2201/46115* (2013.01); *C02F 2201/46125* (2013.01); *C02F 2209/001* (2013.01); *C02F 2209/005* (2013.01)

(58) Field of Classification Search
CPC ........ B01D 61/44; B01D 61/46; B01D 61/50; B01D 61/52; B01D 61/54; C02F 1/4604; C02F 1/4691; C02F 1/4693; C02F 1/4695
See application file for complete search history.

(56) References Cited

FOREIGN PATENT DOCUMENTS

| JP | 68028006 | * 12/1965 |
| JP | 68028006 B | * 12/1965 |

OTHER PUBLICATIONS

Notice of Allowance/Allowability with foreign reference cited, dated Dec. 24, 2013 for U.S. Appl. No. 13/278,983 (17 pages).

*Primary Examiner* — Keith Hendricks
*Assistant Examiner* — Salil Jain
(74) *Attorney, Agent, or Firm* — Ronald J. Richter; Hasse & Nesbitt LLC

(57) ABSTRACT

A device and process are disclosed for the separate removal of oppositely charged ions from electrolyte solutions and recombining them to form new chemical compositions. The invention provides the ability to create multiple ion flow channels and then form new chemical compositions therefrom. The process is accomplished by selectively combining oppositely charged ions of choice from different electrolyte solutions via the capacitive behavior of high electrical capacitance electrodes confined in insulated containers.

6 Claims, 11 Drawing Sheets

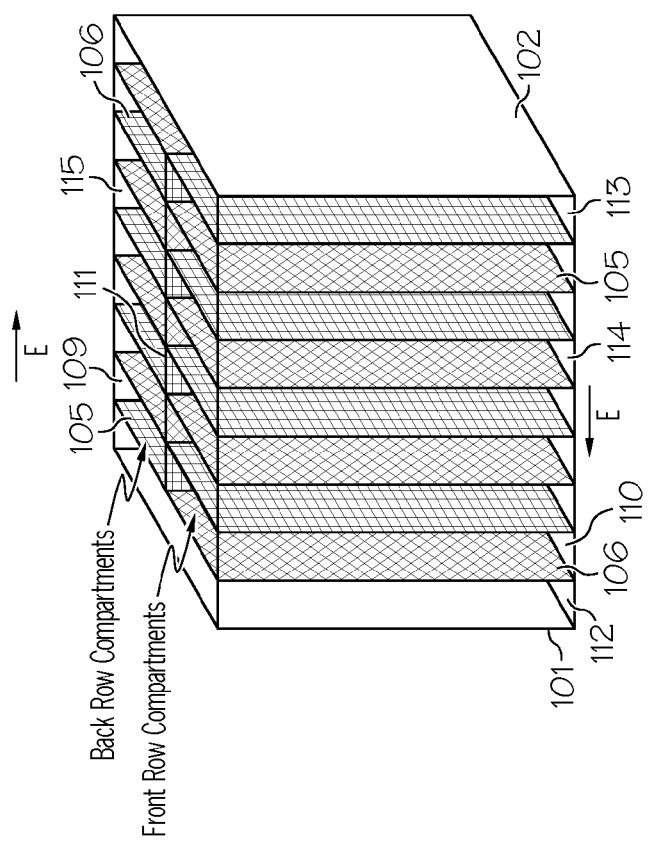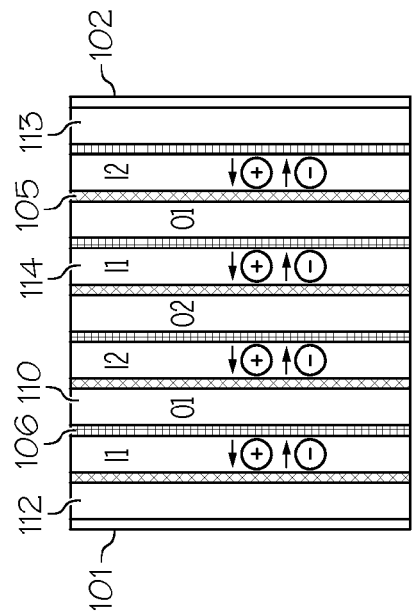
FIG. 11a
FIG. 11b

APPARATUS AND PROCESS FOR SEPARATION AND SELECTIVE RECOMPOSITION OF IONS

CROSS-REFERENCE TO RELATED APPLICATIONS

This application is a divisional application of U.S. application Ser. No. 13/278,983 filed Oct. 21, 2011 which claims the benefit of U.S. Provisional Application No. 61/455,516, filed Oct. 22, 2010, and U.S. Provisional Application No. 61/572,413, filed Jul. 18, 2011, the disclosures of which are incorporated herein by reference in their entirety.

FIELD OF THE INVENTION

The present invention relates to the selective re-combination of ions from differing electrolyte solutions to provide a new manufacturing method for chemicals whose constituents are ions. This invention also relates to a novel process and apparatus for removal of ions from liquids such as sea water, brackish water, and water with elevated hardness.

BACKGROUND OF THE INVENTION

There are many useful chemical compounds which, given their limited occurrence in nature, are manufactured through chemical processes in which oppositely charged ions from one compound are exchanged for those of another. Because such processes typically involve a large number of steps to reach the final product, requiring formation of many intermediate chemicals and also using a large amount of energy, there is a need for simplification of these processes and the reduction of energy consumption for their manufacture.

Synthesis of such useful chemical compounds from chemicals containing the constituent elements of these compounds is an ongoing goal of research and development in the chemical industry. Known synthesis processes that have proven successful have been more direct and less energy intensive. One example is the Solvay process for manufacture of sodium carbonate from sodium chloride (common salt) and calcium carbonate (Lime Stone) using ammonia. The overall chemical equation for the Solvay Process can be written as:

$$CaCO_3 + 2NaCl \rightarrow Na_2CO_3 + CaCl_2 \quad \text{(Equation 1)}$$

However, in order to reach the end products, the Solvay process involves many intermediate steps, and is centered about a large hollow tower. At the bottom of the tower, calcium carbonate (limestone) is heated to release carbon dioxide:

$$CaCO_3 \rightarrow CaO + CO_2$$

At the top of the tower, a concentrated solution of sodium chloride and ammonia enter the tower. As the carbon dioxide bubbles up through it, sodium bicarbonate is precipitated according to the following equation:

$$NaCl + NH_3 + CO_2 + H_2O \rightarrow NaHCO_3 + NH_4Cl$$

The sodium bicarbonate is then converted to sodium carbonate by heating it, releasing water and carbon dioxide:

$$2NaHCO_3 \rightarrow Na_2CO_3 + H_2O + CO_2$$

Meanwhile, the ammonia is regenerated from the ammonium chloride byproduct by treating it with the lime (calcium hydroxide) left over from carbon dioxide generation:

$$CaO + H_2O \rightarrow Ca(OH)_2$$

$$Ca(OH)_2 + 2NH_4Cl \rightarrow CaCl_2 + 2NH_3 + 2H_2O$$

Looking at Equation 1 above and comparing it to the many steps needed to accomplish the Solvay Process, it is apparent that it would be beneficial if the constituent ions of calcium carbonate and sodium chloride can be independently isolated and recombined in a single step.

Another case in point is production of sodium hydroxide (NaOH) and hydrochloric acid (HCl) from common salt and water. The overall chemical equation for this process is:

$$NaCl + H_2O \rightarrow NaOH + HCl \quad \text{(Equation 2)}$$

However, this process involves the electrolysis of salt to generate sodium hydroxide and chlorine and hydrogen gases at great expenditure of electric energy followed by reaction of hydrogen and chlorine gases. However, if sodium and chlorine ions can be independently isolated, as well as the constituent ions of water, then by mixing oppositely charged ions of the two input chemicals, the final products of sodium hydroxide and hydrochloric acid can be more quickly and easily generated.

The chemical equations above all adhere to the principal of electro-neutrality, which means that, in uncharged electrolytic solutions, the concentrations of all ionic species are such that the solution as a whole remains electrically neutral. That is, if one removes a certain amount of positively charged ions from an uncharged electrolyte solution, the remaining negatively charged solution cannot regain its electric neutrality until the same amount of negative charges are also removed, or until the balance of positively charged ions are returned to the solution. Due to the great attractive forces generated by positive and negative charge separation, the synthesis processes for various compounds have been based traditionally on phase shift techniques, such as precipitation, evaporation or electrolytic techniques in which electric charge balance are constantly maintained.

The present invention has the goal of synthesizing new chemical compounds that traditionally have been hard to construct, by exchanging oppositely charged ions from one chemical compound for those of another. The invention also provides an innovative apparatus and method for desalination of water by selective removal and depletion of ions.

Conventional desalination processes presently being used include distillation, ion exchange, reverse osmosis, electro-dialysis and filtering. Distillation is probably the oldest method of water purification. Water is first heated to boiling, and the water vapor rises to a condenser where cooling water lowers the temperature so the vapor is condensed, collected and stored. Most contaminants remain behind in the liquid phase vessel. However, even modern distillation techniques such as multi-stage flash distillation and multi-effect distillation can be expensive, as they require large amounts of energy to evaporate the water and condense the fluid. Also, organics with low boiling points cannot be removed efficiently from the distillate, and can become concentrated in the product water.

Reverse Osmosis (RO) in recent years has been the preferred choice for new desalination facilities, producing potable water by blocking the passage of ions through the membranes used. However, the process requires expensive membranes that must be meticulously maintained and replaced at regular intervals, and high pressure and energy to push saline water through the very tight membranes.

Electro-dialysis (ED) is a combination of electrolysis and ion exchange, resulting in a process which effectively deionizes water while the ion exchange resins are continuously regenerated by the electric current in the unit. This electrochemical regeneration replaces the chemical regeneration of conventional ion exchange systems. In this method, two electrodes are positioned on the two sides of a stack of anion and cation exchange membranes, typically referred to as an electrolysis cell. The spacings between these membranes define compartments through which water can flow. Saline water is made to flow through all these compartments while an electric field is established between the two electrodes. The outlets from every other compartment are connected together. The stack is setup such that a cation exchange membrane faces the cathode (negative electrode) and an anion exchange membrane faces the anode (positive electrode). Movement of cations towards the cathode and anions towards the anode causes the depletion of both ions from every other compartment referred to as dilute compartments and their concentration in the compartments between the dilute compartments called concentrated compartments.

As with RO, electrodialysis systems require feed pre-treatment to remove species that coat, precipitate onto, or otherwise "foul" the surface of the ion exchange membranes. However, electrodialysis reversal can minimize scaling by periodically reversing the polarity of the electrodes and/or the flows of the diluent and concentrate streams. When polarity of the applied potential between the two electrodes is reversed, the dilute compartments become concentrated compartments and vice versa. This reversal process is used to clean and rejuvenate the membranes.

A great deal of innovative work has recently been done on ED technology. For example, published U.S. Patent App. No. 2011/0180477 to Ganzi et al discloses use of a pair of electrodialysis devices containing monoselective membranes to partially desalinate the seawater being treated. The dilute stream from both devices are sent to an ion exchange softener where calcium and other scaling ions are removed or reduced in concentration, and the effluent from the softener is sent to an electrodeionization device to produce final water product. Despite improvements, ED technology still suffers from a number of shortcomings, such as high energy consumption and the need to pre-purify the incoming water, such as with reverse osmosis.

Capacitive deionization (CDI) is an emerging electrochemical water treatment technology that uses electrophoretic driving forces to achieve desalination. While CDI, like electrodialysis, drives ions to the electrodes, CDI does not involve membranes. It is therefore a low pressure process of deionization that has the possibility of directly competing with reverse osmosis or distillation as a means of delivering water free of ions at reduced cost and operating expense.

CDI works by sequestering ions or other charged species in the electrical double layer of ultracapacitors. During CDI, ions are adsorbed or captured onto the surface of porous electrodes by applying a low voltage (1.0-1.7 VDC) electric field. The negative electrodes attract positively charged ions such as sodium, calcium, and magnesium; simultaneously, the positive electrodes attract negatively charged ions such as chloride, nitrate and sulfate. Unlike ion exchange processes, no additional chemicals are required for regeneration of the electrosorbent in this system. Eliminating the electric field allows ions to desorb from the surface of the electrodes and regenerates the electrodes. The amount of charge that can be collected is determined by the surface area available on the electrodes.

There are a variety of CDI electrode materials and configurations to enhance performance. Optimized carbon aerogel is an ideal electrode material because of its high electrical conductivity, high specific surface area, and controllable pore size distribution. In the charging cycles of these capacitors, equal amounts of positively and negatively charged ions are removed from the base electrolytic solutions (saline water) and are attracted to the capacitor plates. Through many cycles of passage of a given volume of electrolyte solution between the capacitor plates, reduction in ion content is achieved.

CDI technology has received considerable attention due to its potential for lower energy consumption, and has been under continuous development since the early 1970's. Even so, due to limitations in the amount of ions removed, and the time it takes to remove these ions, capacitive deionization technology has been limited to low salinity waters and deionization applications. Typical among earlier developments in this field are U.S. Pat. No. 5,425,858 to Farmer and U.S. Pat. No. 5,789,338 to Kaschmitter. These patents exemplify the use of flow-through capacitors (meaning that saline water flows through the capacitor and in between capacitor plates) and developments in carbonaceous high capacitance capacitor plate materials, respectively.

Most current CDI technologies use capacitor plate arrangements that follow various forms of parallel plate capacitors, as exemplified by U.S. Pat. No. 5,620,597 to Andelman. Further developments of higher electrical capacitance and lower electrical resistance capacitor plate materials are exemplified by U.S. Pat. No. 5,626,977 to Mayer et al. and U.S. Pat. No. 7,505,250 to Cho et al. There have also been attempts at improving the efficiency of the charging and discharging cycles by specific electric circuitry as exemplified by U.S. Pat. No. 7,138,042 to Tran et al.

While known desalination methods and devices may be useful for their intended purposes, there currently is no device or method for synthesizing new and useful chemical compounds from the byproducts of desalination. It would thus be beneficial to provide a desalination device that can provide a means for creating new chemical compounds from other chemical compounds containing their constituent elements. It would also be beneficial to simplify the manufacture of various chemical substances and to reduce the energy consumption for their manufacture. There is also a need for further improvement of ion separation technology by substantially increasing the amount of ions removed in any given time span.

SUMMARY OF THE INVENTION

Accordingly, the present invention generally relates to an apparatus and process for the separate removal of oppositely charged ions from each of two different electrolyte solutions as ion streams, and the recombination of these ion streams into new chemical compounds. Oppositely charged ions can be separately extracted from at least one input solution, resulting in depletion of ions from the input solution and generation of two ionically imbalanced streams, i.e. a positive ionic stream and a negative ionic stream, each having an excess of one polarity of ions. These ionic streams can then be drawn into an ion sink and combined with ionic streams from a different electrolyte solution to obtain new solutions or chemical compounds as compared with the original input solutions.

A first aspect of the invention provides an apparatus for separation and selective recomposition of ions, comprising in combination: (a) a first ion repulsion cell through which a first electrolyte solution can pass, the first ion repulsion cell comprising an insulated container; (b) a first electrode secured inside the first ion repulsion cell; (c) a first pair of flow path means, one of the first pair of flow path means hydraulically connecting the first ion repulsion cell to a first ion sink, the other of the first pair of flow path means hydraulically connecting the first ion repulsion cell to a second ion sink, each of the first and second ion sinks comprising an insulated container made from nonconductive material and having a corrosion resistant, metallic reference electrode secured inside, wherein each of the first pair of flow path means includes a flow cutoff valve for selectively opening and closing the flow path means and an ion selective membrane for selectively facilitating flow of ions from the first ion repulsion cell to the ion sinks while preventing the reverse flow of ions from the ion sinks to the first ion repulsion cell; (d) a second ion repulsion cell through which a second electrolyte solution can pass, the second ion repulsion cell comprising an insulated container; (e) a second electrode secured inside the second ion repulsion cell; (f) a second pair of flow path means, one of the second pair of flow path means hydraulically connecting the second ion repulsion cell to the first ion sink, the other of the second pair of flow path means hydraulically connecting the second ion repulsion cell to the second ion sink, wherein each of the second pair of flow path means include a flow cutoff valve for selectively opening and closing the flow path means and an ion selective membrane for selectively facilitating flow of ions from the second ion repulsion cell to the ion sinks while preventing the reverse flow of ions from the ion sinks to the second ion repulsion cell; (g) an electric current supply source for connecting to and controlling the polarities of the first and second electrodes inside the first and second ion repulsion cells, wherein the electric current supply source is also connected to the reference electrodes inside the first and second ion sinks; and (h) a control device connected to the electric current supply source and to each of the flow cutoff valves for sensing the potential difference between the first and second electrodes inside the first and second ion repulsion cells and then opening or closing the flow cutoff valves to allow ions to flow from the ion repulsion cells to the ion sinks.

A second aspect of the invention provides a process for the separation and selective recombination of oppositely charged ions from two different electrolyte solutions, the process comprising: (a) providing a first input electrolyte solution and a second input electrolyte solution in insulated containers, each input electrolyte solution comprising an equal amount of positive and negative ions; (b) generating a positively charged ion stream and a negatively charged ion stream from each electrolyte solution; and (c) selectively combining the positive ion stream from the first input solution with the negative ion stream from the second input, and the negative ion stream from the first input solution with the positive ion stream from the second input solution, to form new chemical compositions.

A third aspect of the invention provides a process for generating ion streams, comprising: (a) providing a first electrolyte solution and a second electrolyte solution, wherein each solution is placed in an insulated container and comprises an equal amount of positive ions and negative ions; (b) separating the positive ions from the negative ions in each of the first and second electrolyte solutions; (c) electrically drawing the separated ions out of each of the first and second solutions as positive and negative ion streams, wherein the ion streams are generated in a continuous fashion and each of the ion streams are selectively drawn through an ion selective membrane; and (d) pooling each of the ion streams into either a first ion sink or a second ion sink.

The nature and advantages of the present invention will be more fully appreciated from the following drawings, detailed description and claims.

BRIEF DESCRIPTION OF THE DRAWINGS

The accompanying drawings illustrate embodiments of the invention and, together with a general description of the invention given above, and the detailed description given below, serve to explain the principles of the invention.

FIG. 11a illustrates a three-dimensional view of a stacked cell arrangement of one embodiment of the device of the invention.

FIG. 11b presents a frontal view of the device of FIG. 11a.

DETAILED DESCRIPTION OF THE INVENTION

Figure 1:
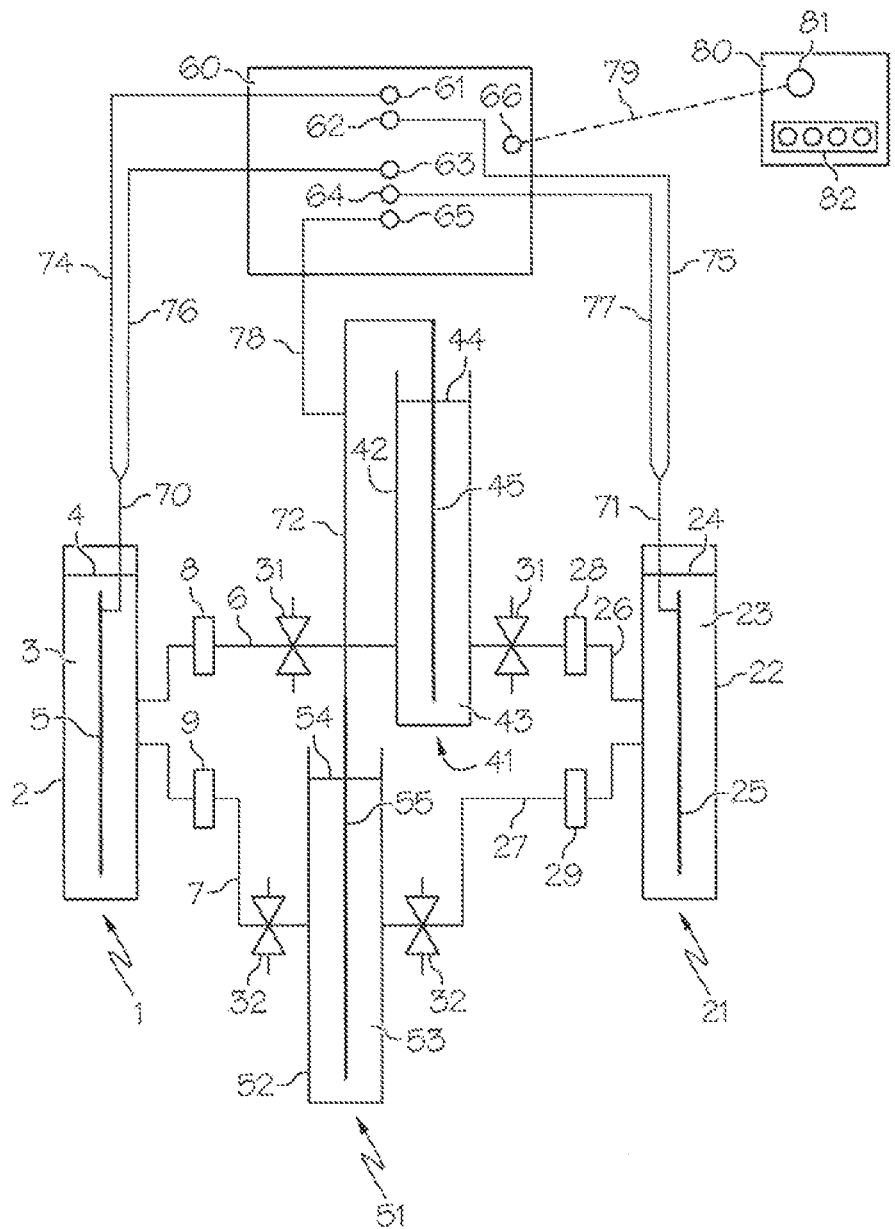
FIG. 1 illustrates one embodiment of the invention including two Ion Repulsion Cells (IRC), two ion sinks and the command and control instruments.

This invention provides a process and apparatus for separating and removing oppositely charged ions from a given electrolyte solution and then selectively recombining these oppositely charged ion streams with ion streams from a second electrolyte solution to form new chemical compositions. There are also variations in operational and design aspects of this invention in which the required ion streams can be generated through Redox reactions.

As defined herein, the terms "ion" or "ions" refer to hydrated ions as they exist in electrolyte solutions. The terms "active electrode" and "counter electrode" can also mean "anode" and "cathode," depending on their charge. To explain the scientific basis of this invention, some basics of capacitor science are reviewed and highlighted.

A conventional electric capacitor is an electric energy storage device made up of two electrically conductive plates that functions on the basis of removal or placement of electrons from one conductive plate, resulting in the reverse phenomena of placement or removal of electrons from the other conductive plate of the capacitor, by the action of the electric field generated by the charge removed or placed on the first plate. This charge separation leads to a potential difference between capacitor plates and storage of electric energy by the capacitor. The electric potential, the electric charge and the electric energy stored in capacitors can then be used when capacitors are used in electric circuits.

Capacitance (C) of a capacitor in units of Farad is defined as the ratio of the amount of charge (Q) in units of Coulomb placed on or removed from each of capacitor plates, to the potential difference (V) in units of Volts between capacitor plates, or:

$$C = Q/V \qquad \text{(Equation 3)}$$

This electrical capacitance is a function of capacitor geometry and plate material and the permittivity of the material between the two capacitor plates. Capacitance increases with larger plate sizes, smaller distance between plates, higher permittivity of the material between plates and the use of higher surface area plate materials. In addition to the effect on increasing the permittivity, the choice of the dielectric material placed between the capacitors plates also set the limit for the maximum potential difference between plates as it relates to sparking which is electric discharging between capacitor plates or the breakdown of the dielectric between the plates.

The amount of energy stored in a capacitor is directly proportional to the amount of charge and the potential difference between plates. If the energy stored in a capacitor is designated as (U) in units of Joule, then:

$$U=0.5*Q*V \quad \text{(Equation 4)}$$

The parameters and units are as defined earlier. Further it is noted that when two capacitors with capacities "C1" and "C2" are placed in series, the equivalent capacitance, or "Ceq" of the two connected capacitors, is defined by:

$$1/Ceq = 1/C1 + 1/C2 \quad \text{(Equation 5)}$$

This equation shows that when two capacitors are placed in series, the equivalent capacitance is effectively controlled by the capacitance of the capacitor with lower Capacitance. Further it is noted that as the amount of charge placed on two capacitors in series, herein denoted as "q" are equal, the potential difference between the plates of such individual capacitors denoted as "V1" and "V2" are defined as:

$$V1 = q/C1 \quad \text{(Equation 6)}$$

And $$V2 = q/C2 \quad \text{(Equation 7)}$$

And therefore;

$$V1/V2 = C2/C1 \quad \text{(Equation 8)}$$

The total potential difference across the two capacitors connected in series is herein denoted as V is:

$$V = V1 + V2 \quad \text{(Equation 9)}$$

The above equations and particularly Equation 8 clearly indicate that when a capacitor with a very large capacitance in placed in series with another capacitor with very small capacitance, most of the potential difference applied across the two capacitors will occur across the capacitor with smaller Capacitance.

Since 1957 a new concept in capacitors has emerged. This new concept is what is typically referred to as super-capacitors or electrochemical capacitors or electric double-layer capacitors (EDLC) which all refer to the same thing. In EDLCs the insulating dielectric is replaced with an electrolyte and the plates are usually made up of high surface area material incorporating such material as activated carbon, carbon aerogels or carbon aerogel composites. Carbon aerogels are electrically conductive and porous material having a very large surface area and a very high electrical capacitance. The capacitances of EDLCs are several orders of magnitudes larger than regular capacitors that use metallic plates and insulating dielectrics.

The increase in the electric capacitance of EDLCs is thought to be the result of formation of electric double layers, which are specific concentration of ions on and at very close proximity to each of the high surface area conductive capacitor plates. Thus, a charged EDLC includes two internal capacitors placed in series. In each of these internal capacitors, one capacitor plate is made up of a charged, conductive, high surface area plate and the other is made up of concentration of ions of opposite polarity in comparison to the charge on the high surface area plate. The high capacitances of EDLCs are the result of extremely small separation between the charged capacitor plates of the aforementioned internal capacitors.

Given the utility and level of control provided by the potentiostat device in implementation of the experiments, it is worth mentioning that a potentiostat is an electric current or potential supply source usually used to control three-electrode electrochemical cells. This device functions by maintaining the potential of an active electrode at a constant level with respect to a reference electrode by adjusting the current at a counter electrode. That is, this device automatically applies an opposing potential to the counter electrode such that the same amount of ions of opposite polarity are generated at the counter electrode to balance out the ions generated at the active electrode, allowing for maintenance of the intended potential difference between the active and the reference electrodes.

The potentiostat device also allowed the specification of the currents generated acting as a current source. This way, instead of specifying a set potential difference between the active and the reference electrode, the electric currents can and were specified and generated. As a result, the potentiostat automatically adjusted the potential difference between the active and the reference electrodes on one hand, and the counter electrode and the reference electrode on the other hand, so that the currents generated at both active and counter electrodes were equal in magnitude and opposite in polarity. By the use of a potentiostat instead of a more common potential or current source, the point of zero potential can be specified. This point facilitated the execution and understanding of the tests. Indeed, in actual practice of this invention, simple potential or direct current power sources can replace a potentiostat as the electric fields generated that propagate and are established with the speed of light (300,000 km/ second) are the same. That is, a direct current power source is capable of generating electric currents of opposite polarity, and it does not need to utilize the reference electrodes to equalize the currents at the active and counter electrodes.

FIG. 1 illustrates an embodiment of the invention including two Ion Repulsion Cells (IRCs), two ion sinks, and command and control instruments. A first IRC 1 is made of an insulated container 2 made from nonconductive material, containing a first input electrolyte solution 3 filled to a level 4 over a high capacitance, high surface area, electrically conductive electrode 5 and has two flexible tubes or pipes 6 and 7 connected to it. There is also a second IRC 21 with all the parts similar to IRC 1 and, designated with numerical identifiers that are 20 digits higher than those of IRC 1, including a second input electrolyte solution 23. Each of the pipes 6, 7 and 26 and 27 are equipped with inline filter holders identified by numerals 8, 9 and 28 and 29 respectively, each containing a membrane. Pipes 6 and 26 each include a flow cutoff valve 31, and pipes 7 and 27 also each include a flow cutoff valve 32. IRCs 1 and 21 are hydraulically connected to ion sink 41 through pipes 6 and 26 and to ion sink 51 through pipes 7 and 27. Ion sink 41 includes an insulated container 42, made from nonconductive material, filled with electrolyte 43 to level 44 and houses a corrosion resistant metallic electrode 45 which is the reference electrode in this ion sink. Ion sink 51 is a duplicate of ion sink 41 with all the parts identified with numerals 10 digits higher than those of ion sink 41. There is also an electric current supply source 60, illustrated here as a potentiostat 60 having electric ports 61, 62, 63, 64 and 65.

In IRCs 1 and 21, electrodes 5 and 25 are preferably submerged below levels 4 and 24 respectively to avoid evaporation from exposed electrode surfaces. Each electrode 5, 25 is connected to a corrosion resistant metallic wire, 70, 71 leading out of the IRC. Reference electrodes 45, 55, of the ion sinks 41, 51, are electrically connected to each other through wire 72. Electric ports 61 and 62 of the potentiostat 60 are the active electrode and the counter electrode ports, respectively, and are connected to electrodes 5 and 25 through wires 74 and 70 for IRC 1, and wires 71 and 75 for IRC 21. The potentiostat's active electrode sensing port 63 is also electrically connected to wire 70 through wire 76, and the potentiostat's counter electrode sensing port 64 is electrically connected to wire 71 through wire 77. The connection between the potentiostat's reference electrode port 65 to wire 72 (which connects reference electrodes 45 and 55) is provided through wire 78. Potentiostat 60 also has another port 66 that outputs a voltage level equal to the potential difference between the active electrode and the reference electrode ports 61 and 65. Cable 79 connects this port 66 to port 81 of control device 80. The four output ports shown in together as outlet 82 of the control device 80 are each connected through appropriate cables (not shown) to flow cutoff valves 31 and 32. Control device 80 senses the polarity of the potential difference between ports 61 and 65 through port 66 and switches one set of flow cutoff valves 31 or 32 open and simultaneously closes the other set.

Here it is noted that the membranes housed in the inline filter holders 8, 28, 9 and 29 are single polarity ion exchange membranes, herein referred to as Ion Selective Membranes or ISM. When the system is operated and the active electrode 5 is negatively charged and therefore the counter electrode 25 is positively charged, one set of flow cutoff valves 31 or 32 will have to be opened and the other set will have to be closed. If under this condition the pair of flow cutoff valves 31 are open through the action of the control device 80, the membrane in the inline filter holder 8 and 29 will have to be anion exchange membranes while the membranes in the filter holders 9 and 28 will have to be cation exchange membranes.

With reference to FIG. 1, it can be appreciated that if the potentiostat power supply source 60 is energized to any voltage level for the active electrode 5, and when the electrical insulation capabilities of the insulated container 2 are high enough to prevent any exchange of electric charge between the contents of this container and the outside environment except through electrode 5 and/or pipe 6 and 7, the build-up of potential of electrode 5 will lead to collection of ions of opposite polarity with respect to the charge supplied to electrode 5 on and in close proximity to this electrode. Consequently, and due to the charge imbalance imposed on the electrolyte solution, ions of similar polarity as the charge placed on electrode 5 will now gather on and in close proximity to the inner surface of insulated container 2, which is also the outer edge of the electrolyte solution 3 placed inside insulated container 2. Thus, if the polarity of the charge placed on the electrode 5 is negative, that is, if electrons are moved onto electrode 5, then ions of positive polarity are attracted to this electrode from the electrolyte and gather on and in close proximity to it, forming an electric double layer. The imbalance in charge distribution in the electrolyte solution 3 caused by attraction of some of its ions to electrode 5 will result in repulsion of ions with opposite polarity with respect to the ions attracted to electrode 5 and their collection at the outer edge of the electrolyte solution 3 which is the inner surface of the insulated container 2. This results in the formation of two capacitors in series. One of these capacitors is formed between electrode 5 and the ions residing or collected on and in close proximity to electrode 5, and the second capacitor is formed by the ions residing or collected on the inner surface of the insulated container and distributed charges in the outside environment (ground). In the first capacitor the available surface area will be high and the charge separation will be extremely small, resulting in much higher capacitance as compared to the second capacitor.

The amount of charge moved onto electrode 5 is governed by the equivalent capacitance of the two capacitors thus formed. In other words, if the capacitor formed by electrode 5 and ions collected on and in close proximity to this electrode is referred to as the inner internal capacitor with a capacitance of "C1" and the capacitor formed by the ions collected on and in close proximity to the inner surface of the insulated container 2 and the outside environment is referred to as the outer internal capacitor with capacitance of "C2" and as these two capacitors are connected to each other in series through the electrolyte between them, the equivalent capacitance of the system, "Ceq", will be as defined by equation 5 (1/Ceq=1/C1+1/C2), and will therefore be very low and close to the small value of "C2". Furthermore, and based on equation 8 (V1/V2=C2/C1) and equation 9 (V=V1+V2), and also based on the major difference between "C1" and "C2", the majority of any potential applied to electrode 4 will be seated across the outer internal capacitor with capacitance of "C2" and only a very small fraction of it will be seated across the inner internal capacitor with capacitance of "C1". In other words, there will be very little potential difference between electrode 5 and electrolyte solution 3.

As a numerical example, if electrode 5 is made up of carbonized aerogel and is placed in an electrolyte solution 3 in turn placed in an insulated container 2, its capacitance and therefore that of the inner internal capacitor can be assumed to be in the order of 10 Farads. Now if the capacitance of the outer internal capacitor would be, as expected, in the order of 0.2 micro-micro farads ($\mu\mu F$), the equivalent capacitance of the hydro-electrochemical capacitor based on equation 5 would for all practical purposes equal to 0.2 $\mu\mu F$. Therefore, if the potential applied to the electrode 5 is 10 volts, and based on equation 3 (C=Q/V) the charge that would move on to electrode 5 will be equal to 2.0 E-12 coulombs. Now with reference to equation 6 (V1=q/C1) and equation 7 (V2=q/C2), and noting that the charge on both these capacitors will be equal, it becomes apparent that the potential seated across the 0.2 micro-micro Farad capacitor will be practically equal to 10 volts and the potential seated across the 10 Farad capacitor will be 2.0 E-13 Volts which is extremely small and practically negligible.

Based on the above and with reference to FIG. 1, when electrode 5 of Ion Repulsion Cell (IRC) 1 is initially connected to pole 61 of the potentiostat 60 and this power supply source is turned on while line 6 and 7 are closed, the amount of charge transferred to the equivalent internal capacitor will be governed by the equivalent capacitance and will be very small. Yet, most of the potential applied will be seated across the outer internal capacitor.

But, if line 6 is opened with no membrane 8 holder and no flow cutoff valve 31, then the liquid in pipe 6 connected to insulated container 2 also forms a part of this outer internal capacitor and the potential at the tip of this pipe located in insulated container 42 of ion sink 41 will also have the potential of the outer internal capacitor with respect to the outer environment or ground. By activating the potentiostat and placing its reference electrode 45 in insulated container 42, the potential within the electrolyte in insulated container 42 will be at ground level. As a result the potential difference between the electrolyte in container 2 and the electrolyte in container 42 will be the source of flow of charges in pipe 6. However, given the fact that the electrolyte in line 6 contains both positively and negatively charged ions, continuous application of the electric field established across this line will cause the flow of one polarity charges in one direction and the flow of oppositely charged ones in the opposite direction. Thus, in order to allow for flow of excess charges gathered on the outer internal capacitor to the outside through line 6, the use of Ion Selective Membranes becomes necessary. By the use of an ISM of proper polarity, excess ions from container 2 move to container 42, while the reverse flow of oppositely charged ions will be prevented.

Further, and with reference to FIG. 1, if the second IRC 21 is charged by the use of a potentiostat device with charges of opposite polarity as compared to IRC 1, the ions collected at the tip of pipe 26 will have opposite polarity with respect to the charges collected at the tip of pipe 6. Indeed, with the setup of the two devices 1 and 21 and with ISM of opposing polarity, and with proper function of the potentiostat resulting in equal magnitude ion currents generated in each of the IRCs, the excess oppositely charged ions from both IRCs 1 and 21 can be directed to ion sink 41 and accumulate therein.

Once some charge is allowed to exit from the outer internal capacitor of IRC 1 through line 6, almost the same amount of charge will now enter into electrode 5 from the potentiostat. That is, as some charges leave the outer internal capacitor, the behavior of the two connected inner internal capacitor and outer internal capacitor will be as if the capacitance of the outer internal capacitor has increased, resulting in the increase of the capacitance of the equivalent capacitor and therefore increase of charge in the inner internal capacitor. The other consequence of this charge transfer is the effect it will have on the potential distribution between the inner and the outer internal capacitors.

When some additional charge is moved into electrode 5, the potential seated across the inner internal capacitor will increase according to equation 6. With the total potential applied across electrode 5 and the outside environment being constant, the consequence is an equivalent reduction in the potential seated across the outer internal capacitor and a consequential proportional reduction in the charge in the outer internal capacitor.

By continued transfer of charge from pipes 6 and 26 to ion sink 41, the potential seated across the inner internal capacitors and their charges continue to increase. Once the potential seated across the electrode 5 and liquid 3 reach the potential required for initiation of electrode reactions, potentially resulting in exchange of charge between the two plates of the inner internal capacitor, further discharge of ions from pipe 6 may not cause proportional further increase in the potential seated across the inner internal capacitor plates, and further electric energy supplied by the potentiostat would no longer be stored. Under such conditions, Redox reactions are initiated. To prevent this event, at this stage the application of electric potential to electrodes 5 and 25 can be stopped or alternatively, the polarity of the applied potentials can be reversed.

By dropping the potentials applied to electrodes 5 and 25 to zero, the ions previously attracted to these electrodes will start to redistribute in liquids 3 and 23 respectively, resulting in buildup of charge in their respective outer internal capacitors. This potential build up and the amount of charge transferred to the outer internal capacitors at the edges of liquids 3 and 23 will now lead to a new pattern of ion flow out of containers 2 and 22. In this discharging cycle, ions gathering at the outer internal capacitors in liquids 3 and 23 will have opposite polarity in comparison to the charging cycle. Here, instead of dropping the potentials applied to electrodes 5 and 25 to zero, the applied potentials can be reversed, resulting in charging the inner internal capacitors with reverse polarity. The effect in this case will be higher potentials at the outer internal capacitors. At this stage the flow cutoff valves 31 on lines 6 and 26 can be closed and flow cutoff valves 32 on lines 7 and 27 can be opened, leading to ion sink 51. With Ion Selective Membrane (ISM) 9 allowing the passage of ions with opposite polarity to those of ISM 8, and with ISM 29 allowing the passage of ions with opposite polarity to those of ISM 28, there will now be an accumulation of oppositely charged ion streams coming from each of the IRCs and passing into ion sink 51.

Thus, if the polarity of the charges placed on the electrode of a given IRC (1 or 21) is positive, placement of a cation exchange membrane (ISM) in the line opened to connect a first IRC to the ion sink (which is maintained at zero potential by the potentiostat) will lead to outflow of excess positively charged ions in the form of a positive ion stream from the first IRC to the ion sink. At the same time, the charge placed on the second IRC will be negative and should have an anion exchange membrane on the line opened to connect it to the same ion sink, allowing negatively charged ions to flow as a negative ion stream into the ion sink. At this stage, new chemical compounds can be formed in the ion sinks by selectively combining the positive ion stream from the first IRC with the negative ion stream from the second IRC, and also combining the negative ion stream from the first IRC with the positive ion stream from the second IRC. Creation and selective recombination of ion streams in this manner can be repeated until the extraction of ions from the input electrolyte solutions leads to a desired level of depletion of ions from each of the electrolyte solutions 3, 23, or until the collection of new chemicals reaches a desired concentration in the ion sinks 41, 51. Pooling of ion streams into either the first ion sink 41 or the second ion sink 51 is typically done by generating the ion streams in a continuous fashion from the input solutions.

Here it is also noted that if the polarity of the ion exchange membranes (ISMs) are such that they would not allow the excess charge collected at the inner plate of the outer internal capacitor within a given IRC to flow out, and would instead only allow for passage of ions with opposite polarity with respect to charges collected at the outer internal capacitor, the effect will be that the excess potential of the inner plate of the outer internal capacitors will now be relieved by entrance of oppositely charged ions with respect to the charges collected at the inner plate of the outer internal capacitor into this region from outside of the cell. Consequently, containers 2 and 22 will now act as ion collection cells (ICCs) rather than ion repulsion cells (IRCs), and ions will be depleted from containers 42 and 52 and will gather in containers 2 and 22. Under this condition, ion sinks will now be ion sources. All other aspects including lowering of the potential at the outer internal capacitors and increase of potential difference between the plates of the inner internal capacitor will be the same as the alternate case, detailed earlier.

Figure 2:
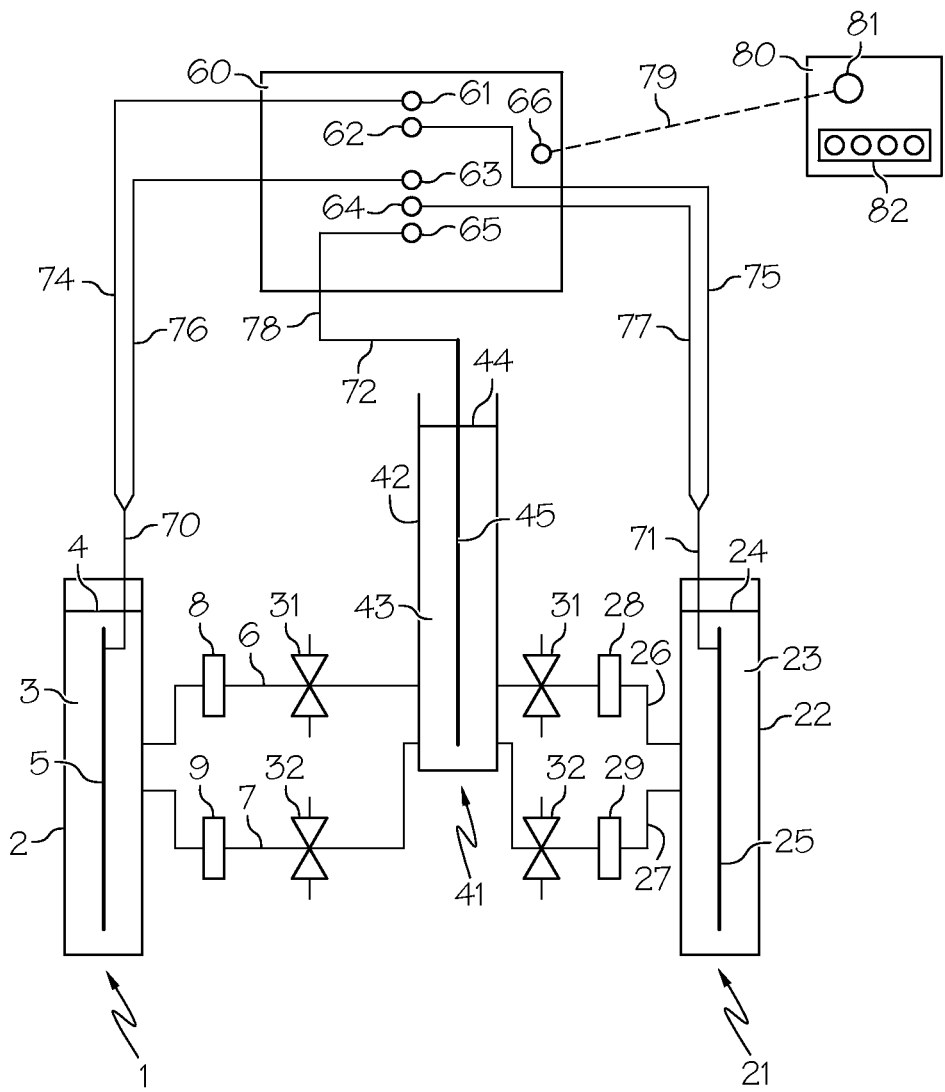
FIG. 2 illustrates another embodiment of the invention having a single ion sink system.

With respect to FIG. 1 it is also noted that when the electrolytes in IRCs 1 and 21 are the same (e.g. sea water or brine) and the intent is desalination, then there is no need to separate the ions leaving the two IRCs and consequently there would be no need for the use of two ion sinks 41, 51 and they can be combined into one ion sink, as shown on FIG. 2. FIG. 2 illustrates nearly the same device as FIG. 1, except that the second ion sink is now eliminated and pipes 7 and 27, as well as pipes 6 and 26, all connect to ion sink 41.

Another embodiment of the present invention is beneficial when water ($H_2O$) is one of the electrolytes. For example, it is often desirable to produce caustic soda (NaOH) and hydrochloric acid (HCl) from sodium chloride (NaCl). For such cases, it is desired to split water molecules into positive H and negative OH ions. But, given the extremely low electrical conductivity of pure water, generation of large currents of such ions in a capacitive mode would require the use of very large electric potentials. To resolve this issue, the modified process shown on FIG. 3 can be used.

Figure 3:
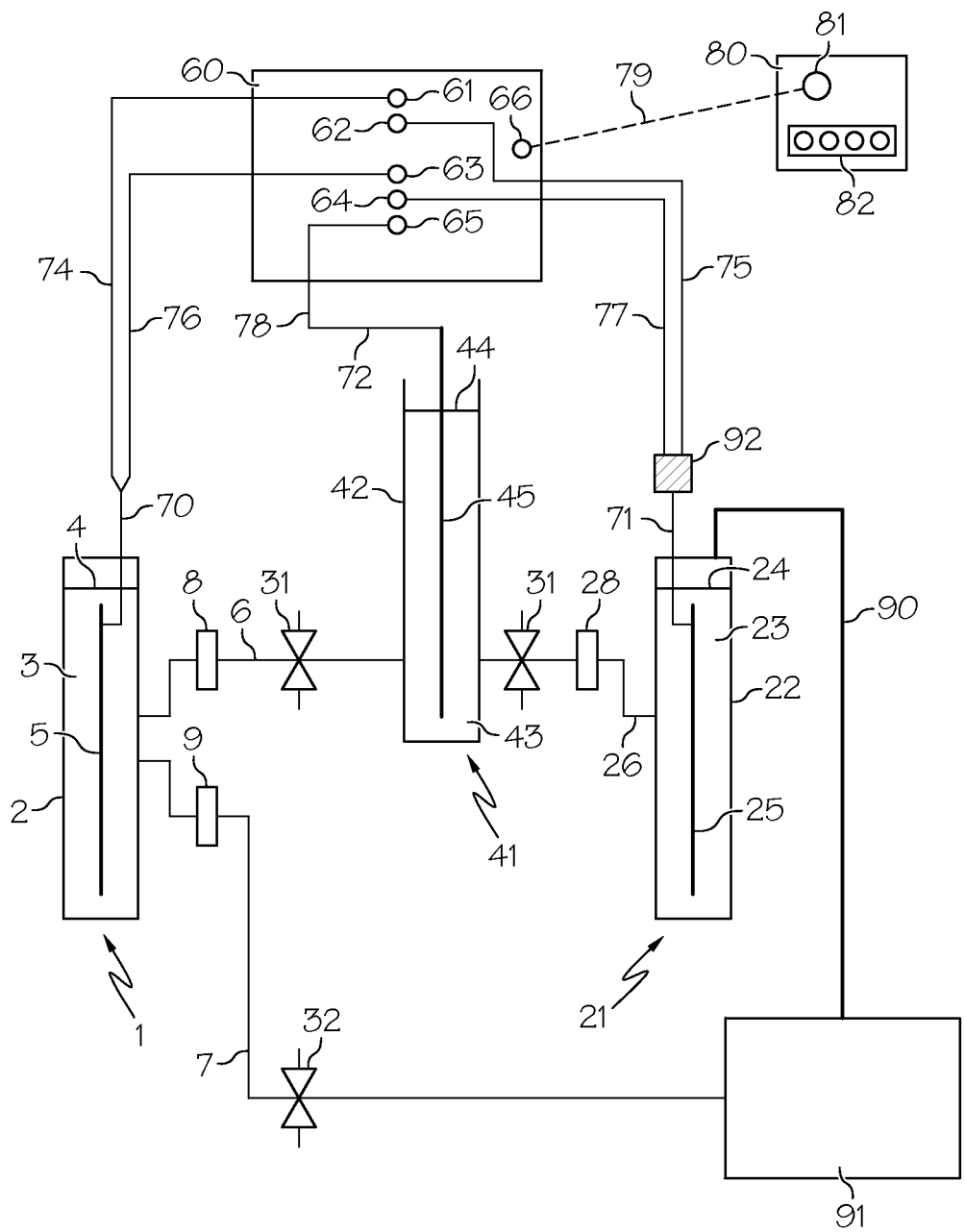
FIG. 3 illustrates another embodiment of the invention in which one of the IRCs acts in a Redox mode.

In FIG. 3 all components identified by numerals up to the potentiostat output ports 82 are the same as those of FIG. 1, with the difference being that the second ion sink 51 and pipe 27 and its attached valve 32 and ISM 29 are eliminated, and that electrode 25 now has much lower electrical capacitance compared to electrode 5. Obtaining a low electric capacitance electrode can be easily achieved by using a metallic electrode for electrode 25, while electrode 5 is still made out of material such as high capacitance carbons or carbon aerogels. In FIG. 3 there is also pipe 90 that connects the empty space above liquid level 24 to device 91. Further, pipe 7 no longer leads to the eliminated ion sink 51 and is instead also connected to device 91. There is also switch 92 that can interrupt the flow of charge to electrode 25. Switch 92 is connected to one of the output ports 82 of control device 80 through connections not shown. Here the input electrolyte solution 3 is a high concentration solution of the raw material such as sodium chloride, and the electrolyte 23 is a solution of specifically selected compound targeted to production of H+ or OH$^-$ ions.

When the goal is for IRC 21 to generate OH$^-$ ions, the electrolyte 23 must contain cations that have lower electrode potential than H+ ions, such as sodium or lithium. By the use of electrolytes such as sodium hydroxide (caustic soda), and with electrode 25 being connected to a cathode, hydrogen gas ($H_2$) will emit from IRC 21 into the empty space above it or to the outside of the cell, and OH$^-$ ions will stream out of line 26 when the ISM in filter holder 28 is an anion exchange membrane. Inversely, when the goal is for IRC 21 to generate H+ ions, the electrolyte 23 would have to contain anions that have higher electrode potential than OH$^-$ such as sulfuric acid. Under these conditions, the electrode 25 will be an anode (positively charged electrode), oxygen gas ($O_2$) will be emitted from IRC 21 to the empty space above it or to the outside of the cell, and H+ ions will stream out of line 26 when the ISM in filter holder 28 is a cation exchange membrane.

Thus, looking at FIG. 3, when electrode 5 is positively charged, ISM 8 is a cation exchange membrane allowing the passage of positive ions, valves 31 are open, ISM 28 is an anion exchange membrane allowing the passage of negatively charged ions and valve 32 is closed, the operation of the potentiostat 60 will result in connection of a negative potential to the now metallic electrode 25. With sufficient electric potential applied, electrode reactions (Redox reactions) are initiated at electrode 25 facilitated by the contents of electrolyte 23. If electrolyte solution 3 in container 2 is sodium chloride and electrolyte 43 is to become a solution of caustic soda (NaOH), electrolyte 23 can be a solution of caustic soda too. Existence of a caustic soda solution as electrolyte 23 in the vicinity of electrode 25 will now result in generation of hydrogen gas at this electrode, and IRC 21 will now generate a negatively charged hydroxide (OH$^-$) ion stream that will flow through line 26, accumulate in Ion sink 41, and neutralize the positively charged sodium ion stream also entering container 42 from line 6. This will result in the formation of NaOH in container 42. Here it is also to be noted that if the requirements of a particular design do not require the separation of the electrolytes 23 and 43, then valve 31 on line 26 and its related ISM 28 can also be eliminated.

Once the potential difference between electrode 5 and electrolyte solution 3 reaches a level that can cause Redox reactions or at any other convenient time before, the polarity of the potential applied to electrode 5 can be reduced to zero (or can be reversed), the valves 31 in lines 6 and 26 can be closed, and valve 32 opened. At this time switch 92 is also commanded to open state preventing flow of electricity to electrode 25. At this stage negatively charged chlorine ions flowing in line 7 can join the hydrogen gas flow in device 91. Device 91 is a reactor in which hydrated chlorine ions and hydrogen gas can be combined to form hydrochloric acid solution. It contains a platinum electrode closely spaced adjacent a proton exchange membrane. Hydrogen gas is allowed to flow between the electrode and the membrane. Chlorine ions are directed to the electrolyte, filling the compartment behind the membrane. Hydrogen gas ionizes in contact with the electrode and passes through the membrane, combining with the chlorine ions and forming hydrochloric acid. The electrode in device 91 must be grounded through an electrical lead so that the electrical energy generated can be used. Also, the grounded electrode reduces the potential of the electrode, allowing for further ionization of the hydrogen gas. Alternatively, the reactor device 91 can be an electrolysis half cell, generating oxygen gas and a positively charged hydrated hydrogen ion stream, for combining with the hydrated chlorine ion stream flowing out of pipe 7, as described with reference to FIG. 4.

Figure 4:
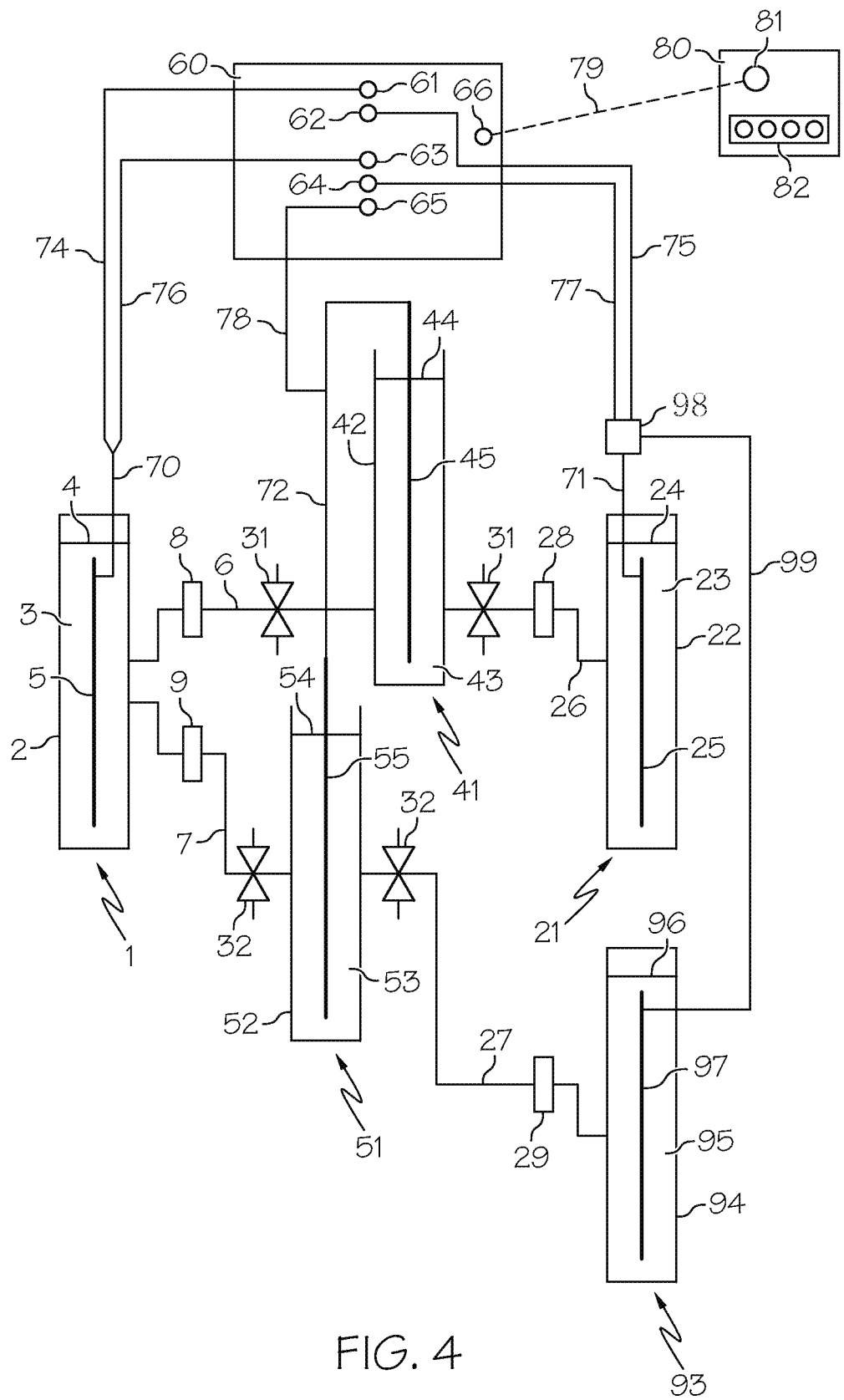
FIG. 4 illustrates another embodiment of the invention in which two IRCs act in Redox mode.

The system presented on FIG. 3 can also be used without ionization of hydrogen gas to produce the needed H+ ions. If needed, a system as presented on FIG. 4 can alternatively be used. In FIG. 4 all parts are similar to FIG. 1 except that another cell 93 is included for Redox reactions. Cell 93 includes an insulated container 94 filled with an electrolyte 95 and is filled to level 96 and has a low capacitance metallic electrode 97, which is similar to electrode 25 (which in this case is also metallic). There is also a diode bridge 98 at the connection between wires 75 and 77 to wire 71. This diode bridge 98 is also connected to wire 99 leading to electrode 97. Parts 93 to 99 on FIG. 4 replace parts 90 to 92 of FIG. 3.

With reference to FIG. 4, when terminal 62 of power supply 60 is positively charged and diode bridge 98 only allows the exit of electrons from electrode 25 (making it an anode), ISM 8 is a cation exchange membrane allowing the passage of positive ions, valves 31 in lines 6 and 26 are open, ISM 28 is an anion exchange membrane allowing the passage of negatively charged ions, and valves 32 in lines 7 and 27 are closed, the operation of the potentiostat 60 will result in connection of a negative potential to the now metallic electrode 25. With sufficient electric potential applied, electrode reactions (Redox reactions) are initiated at electrode 25 facilitated by the contents of electrolyte 23. If electrolyte solution 3 is sodium chloride and electrolyte 43 is to become a solution of caustic soda (NaOH), electrolyte 23 can be a solution of caustic soda too. Existence of a caustic soda solution as electrolyte 23 in the vicinity of electrode 25 will now result in generation of hydrogen gas at this electrode, and IRC 21 will now generate a negatively charged hydroxide (OH$^-$) ion stream that will flow through line 26 and accumulate in Ion sink 41 and neutralize the positively charged sodium ion stream also entering it from line 6. This will result in the formation of caustic soda in container 42. At this stage, if the polarity of terminal 62 changes, by the action of diode bridge 98, electrode 25 will be isolated and electrons begin to flow through wire 99 to the previously isolated electrode 97, making it a cathode. If electrolyte 95 in container 94 is a solution such as sulfuric acid, then the occurrence of electrode reactions at electrode 97 will lead to generation of oxygen gas which can be released or put to other use. At this stage, if valves 32 in lines 7 and 27 are open while valves 31 in lines 6 and 26 are closed, if high capacitance electrode 5 becomes a cathode and electrolyte solution 3 is a sodium chloride solution, and if ISM 9 is an anion exchange membrane and ISM 29 is a cation exchange membrane, the H+ ions will stream out of pipe 27 from cell 93 and neutralize negatively charged chlorine ions streaming out of pipe 7. Although the energy use in the system of FIG. 4 is higher than the system of FIG. 3, there might be situations such as when the gas produced from cell 93 is needed in other processes in which case this option can also be justified and put to use.

Because the present invention is based on absorption and release of ions from capacitors, the rate of ion flow, which is equivalent to flow of electrons in regular capacitors, is a function of the Time Constant of the equivalent RC circuit. Since the time constant is defined as capacitance (C) multiplied by resistance (R), the rate of ion transfer will be higher if the Time Constant is lower. Given this, along with the fact that capacitors are energy storing devices and that energy consumption and dissipation in all RC circuits occur in resistive elements, then it can be appreciated that the lower the electrical resistance in the system, the faster it can operate; and the lower its energy consumption for a given operating condition will be.

Further, the apparatus of the invention can function at differing process rates based on the applied potential. Looking at FIG. 1, it can be appreciated that the rate of ion flow out of this system is not only principally controlled by the electric resistance of pipes 6, 26, 7 and 27 (and their related attachments), but also by the developed potential at the outer internal capacitor that acts on the ions within these passages. Thus, with the application of higher potentials to IRC electrodes resulting in the development of higher potentials at the outer internal capacitor, higher process rates can be obtained through the same equipment. It is also noted that higher process rates result in higher energy consumption.

A mathematical explanation of the above discussion is as follows:

Since power consumption Pr in any resistive element is defined as $Pr=V \times I$; and since electric current I is equal to the charge in unit time, t, it can be said that $I=Q/t$. As a result, $Pr \times t=Q \times V$. And since ($Pr \times t$) is equal to the energy used, it is conclude that Energy Consumption (in Jules)=$Q \times V$. Thus, the resistive aspects of energy consumption in this invention are dependent on the amount of charge and the potential used. Given the fact that in utilization of this system for desalination or ion separation and remixing, the intent is to transfer a certain amount of charge, the higher potential used, the higher the energy consumption and the faster the process rate.

Test Results

Test 1: This test was used to evaluate the transfer of ions from IRCs 1 and 21 to the ion sinks 41 and 51 of FIG. 1. The electrolyte used was a 1.02 specific gravity sodium chloride solution (Corresponding to a salt content of 2.7%) prepared by mixing commercially available distilled water with laboratory grade sodium chloride described in the Equipment and Materials section, below. The test targeted reduction of the specific gravity of over 200 ml of input solution to 1.01 (corresponding to a salt content of 1.4%). As noted, the setup for this test used the arrangement presented in FIG. 1. In this test, individual IRCs were made up of 1 and 3/16 inch OD transparent plastic tubes with the solution height of 170 millimeters. The electrodes in the IRCs were 3/8 in diameter solid carbon rods. The ion sink containers were 3/4 inch in diameter transparent plastic tubing, also with a solution height of 170 millimeters and were equipped with electrodes that were electrically connected to each other as well as to the reference port of the potentiostat. Each IRC was hydraulically connected to the ion sinks using total of 16 centimeters long natural rubber tubing with OD of 12 mm. The filter holders and flow cutoff valves are described below in the "Equipment and Materials" section. The position of ISMs were chosen such that when negative voltage was applied to IRC 1, the negatively charged ions generated would flow through an anion exchange membrane and reach one of the ion sinks, while at the same time the counter electrode was positively charged and caused positive ions to pass through a cation exchange membrane to the same ion sink. During this process the flow cutoff valves on both of these lines connecting IRC 1 and IRC 21 to the same ion sink were open, and the other set was closed.

The power supplies used was a Gamry Reference 3000, controlled and operated through a Sony VAIO laptop computer. Operation of the device was carried out through execution of input commands, organized in repeatable input files. Gamry Reference 3000 potentiostat records the results of the experiments which are stored in output files that could be used to plot out the results. In this test the maximum voltage of positive (+) 6.5 volts was applied for 100 seconds, followed by negative (−) 6.5 volts for 100 seconds in the potentiostat's Chronoamperometry mode, repeated for 20 cycles and covering 4000 seconds in each input and output file. This sequence was repeated for over 220 times over an 11 day period (for effective period of approximately 244 hours) resulting in 4400 cycles of voltage reversals. During this time the test was running for 216 hours. The remainder of the time, about 28 hours, was made up of a number of unforeseen shutdowns caused by auto hibernation of the controlling laptop (one 10 hours period) and the rest was distributed rather evenly throughout the period of testing for specific gravity measurements of the diluted and the concentrated solutions, and for the following adjustments:

As noted, the electrodes used were 3/8 in diameter solid carbon rods. At the beginning of the test, they extended well above the liquid levels in the IRCs and in the ion sinks. In time it was observed that capillary rise of the solutions in the electrodes was causing a drop in the liquid levels as well as some precipitation of salt on the body of the of the electrodes above liquid levels. In the early afternoon of the $3^{rd}$ day the electrodes in the IRCs were shortened to just below the liquid levels and were reconnected to the potentiostat through titanium wires firmly wrapped around each one. At this time the ion sink electrodes were also changed to titanium wires. The liquid levels in the IRCs were then refilled by one to two millimeters by similar solution as the original input solution.

Figure 5:
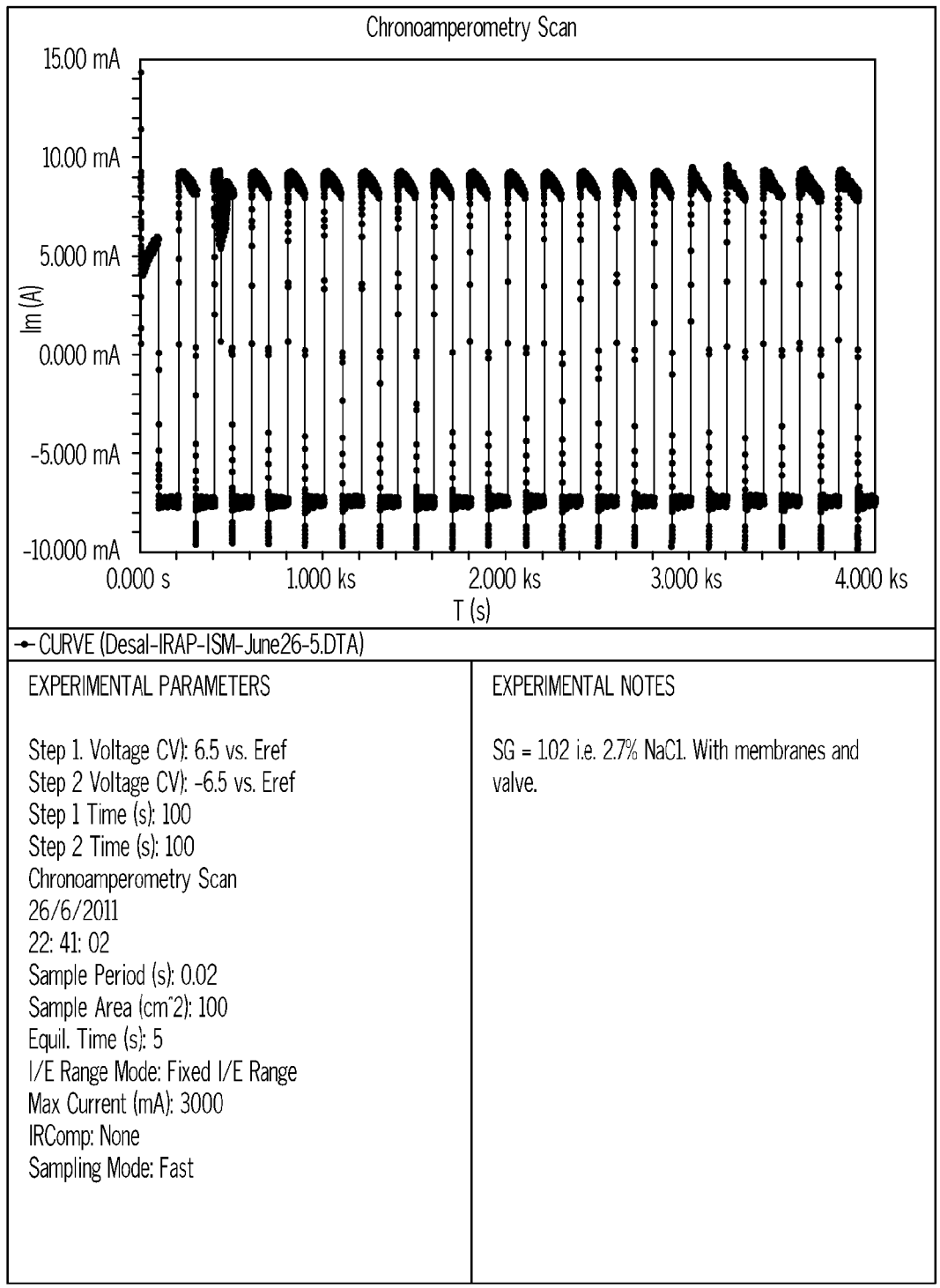
FIG. 5 illustrates representative recorded data during various intervals of test 1.
Figure 6:
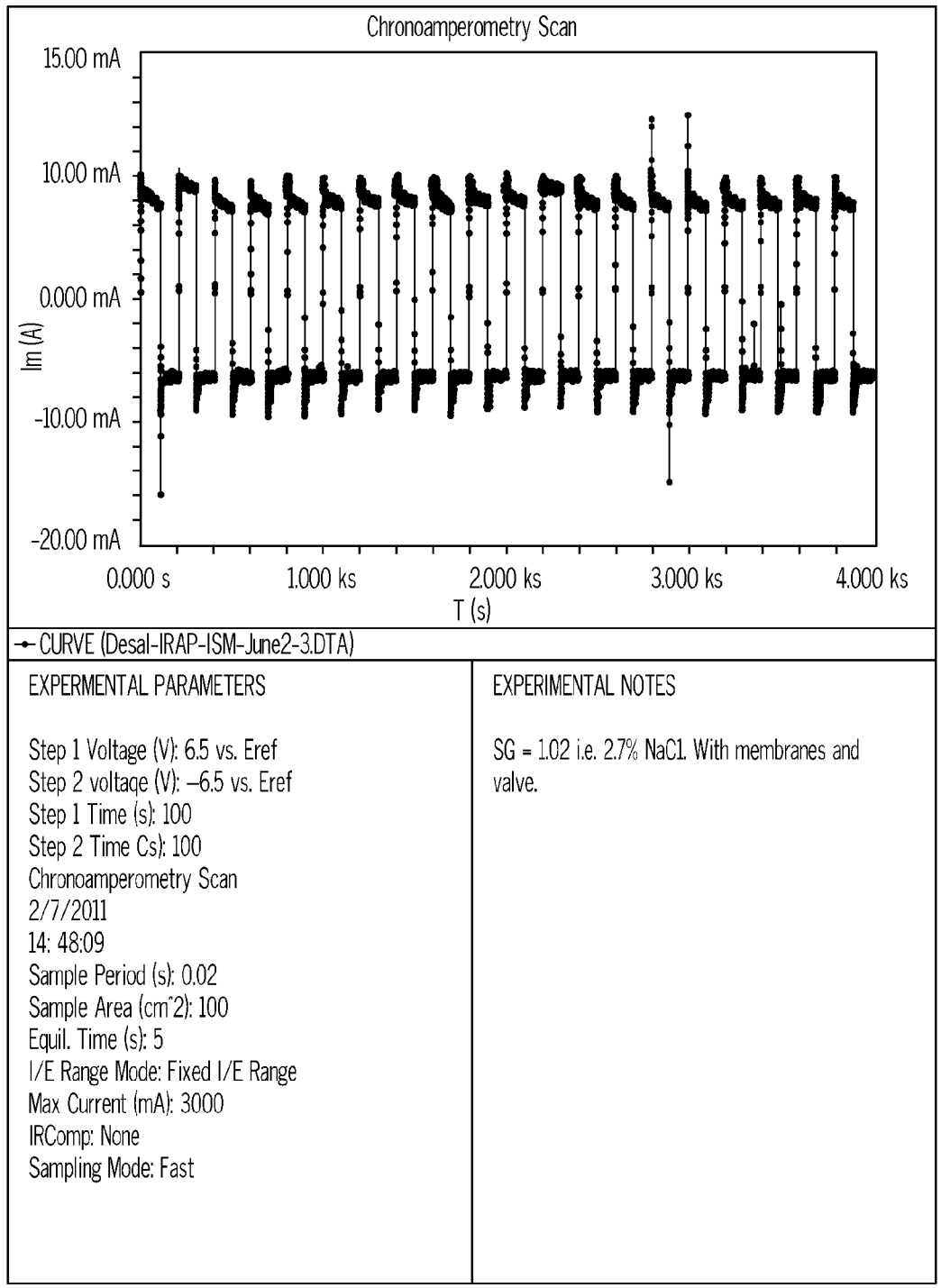
FIG. 6 illustrates representative recorded data during various intervals of test 1.
Figure 7:
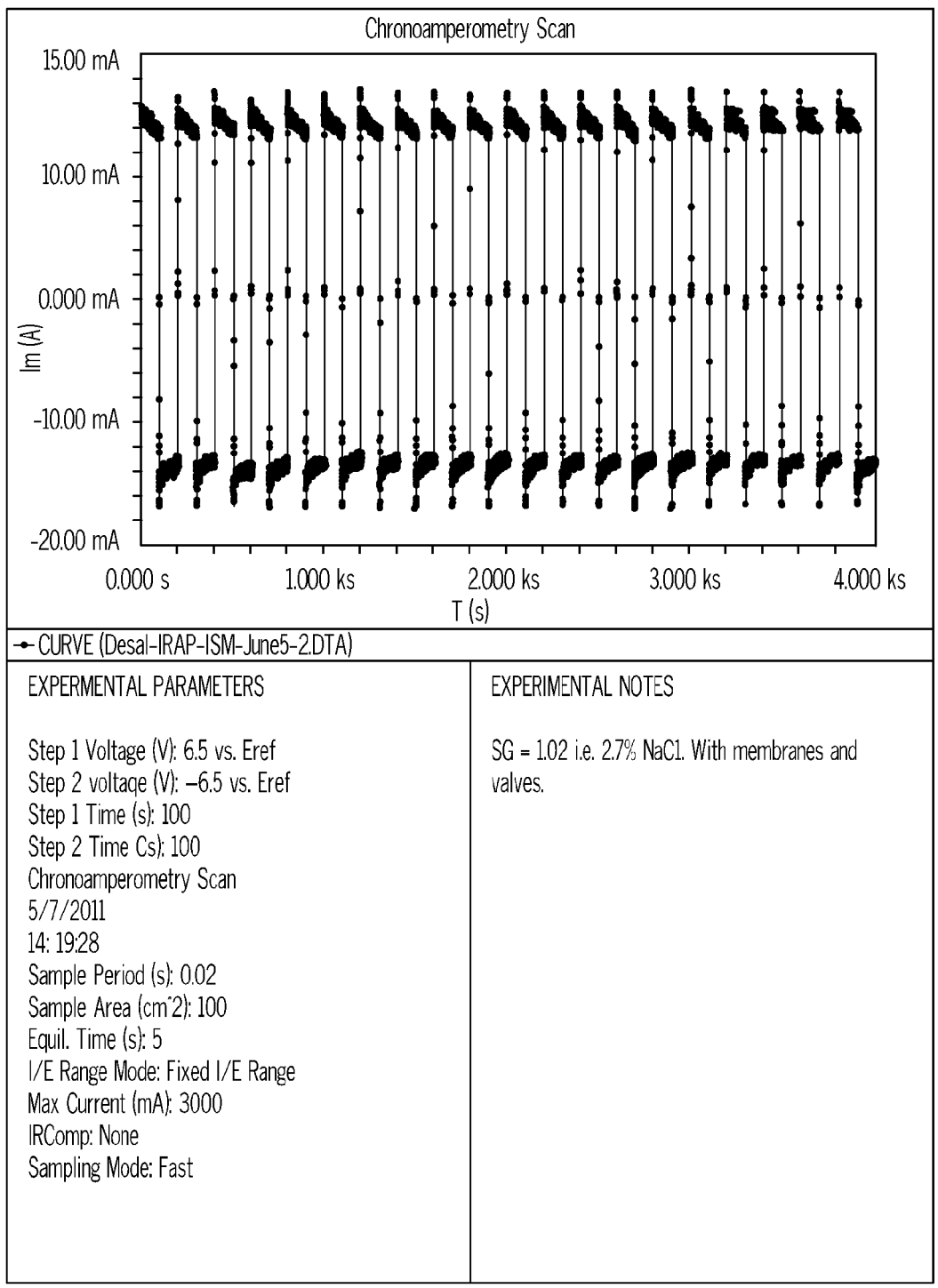
FIG. 7 illustrates representative recorded data during various intervals of test 1.

The liquid contents of the ion sinks were changed a total of 5 times throughout the test, with base solution of specific gravity equal 1.02. Typically this was done when the specific gravity of the concentrated solutions approached or was higher than 1.024. From the beginning of the test and up to the afternoon of the eighth day, the valve control system was operating with a delay of 5 to 10 seconds. This was corrected and the continuation of the test was carried out with perfectly synchronized valve operations. This is clearly observable by comparison of FIGS. 5, 6 and 7. Three output files from the total of over 240 files generated are presented as FIGS. 5, 6 and 7 distributed throughout the testing period.

Figure 8:
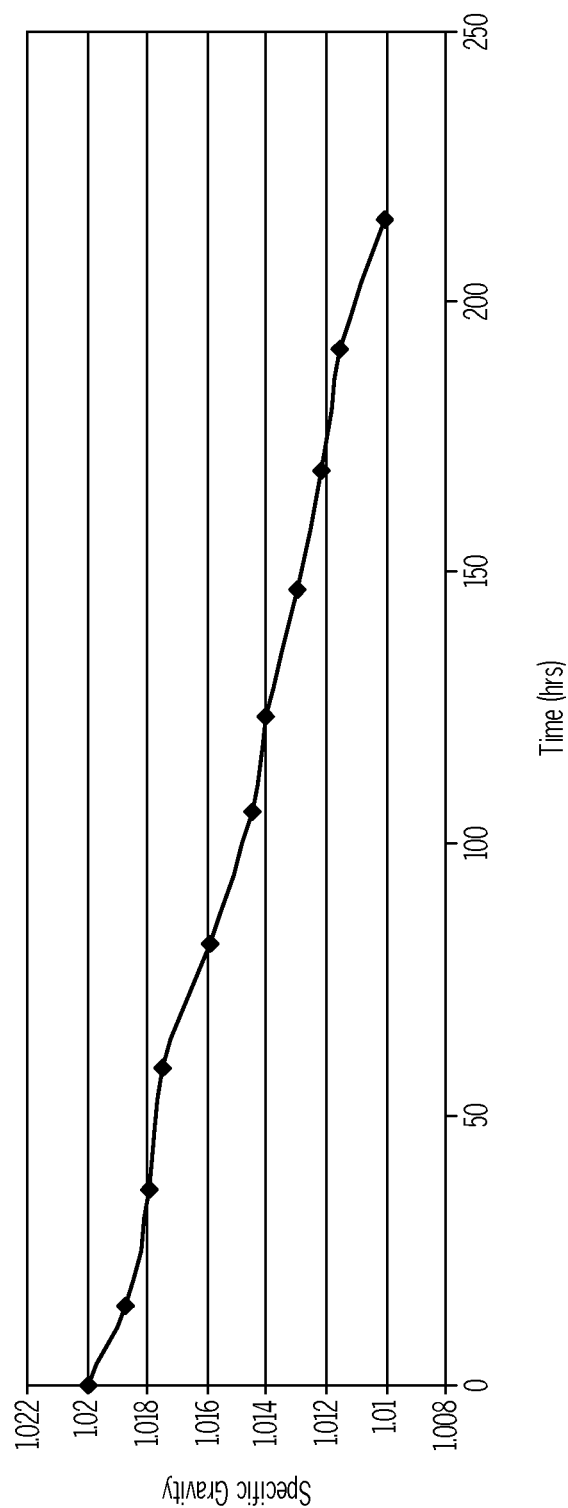
FIG. 8 illustrates variation of specific gravity of the diluted solution as a function of time for test 1.

FIG. 8 shows the variation of specific gravity of the diluted solutions with time from the start to the end of the test. Data collected throughout this test as exemplified by outputs shown on FIGS. 5, 6 and 7, which indicate that the active electrode currents started at an average of about 9 milliamps and reduced to an average of 7 milliamps. This was expected as the salinity and therefore the electric conductivity of the solutions in IRCs were reduced. Because the amount of each of the positive and the negative ions corresponding to the targeted specific gravity reduction were in the order of almost 2200 Coulombs, the required time for an average current of 8 milliamps should have been in the order of 153 hours, and not the about 220 hours experienced. This increased time is attributed to valve operation delays that allowed for reverse ionic currents and some inefficiency of the membranes as used. Despite the above point, the test succeeded in transfer of a total of 4400 Coulombs of total charge to the ion sinks and in major reduction of the salt content of the input solution.

Test 2: The setup for this test was also similar to what is presented on FIG. 1 and test 1, with the difference being that the rubber tube used was 9 mm OD. The active electrode IRC was filled with 10% solution of silver nitrate and the related ISMs were also attached. The counter electrode IRC was filled with 3.5% sodium chloride solution.

Given the difference in the mobility of the ions involved, driving of silver and chlorine ions was done with active electrode at 5.0 volts while sodium and nitrate ions were driven at active electrode voltage of −2.0 Volts. The electric currents were in the order of 100 to 200 micro-amps. In this test, within a 50 minute period of the test in which each potential was applied for 5 minutes, gradual formation of silver chloride signified by formation of a cloud of precipitates in the appropriate ion sink was clearly observed while the solution in the other ion sink remained completely clear.

The test results presented above reconfirm the basic propositions of the present invention, that with use of the process and equipment detailed above, strong ion currents can be generated, depleting ions from one set of locations and concentrating the separated ions in another set of locations in a continuous fashion. The entire process is accomplished without electrode reactions. Further, the process of removal and concentration of ions can be sped up or slowed down at will by simple adjustments of the applied potentials and speed of valve operations. Further, through the use of this invention, oppositely charged ions from the two electrolytes can be directed to two different locations, allowing for the formation of new electrolyte solutions containing oppositely charged ions from each of the original input electrolytes. As a result, the invention can be used to create chemical compounds composed of oppositely charged ions from two differing electrolytic solutions, or for desalination by removal of ions from a given electrolyte such as seawater. The invention can also be used to move oppositely charged ions of a given electrolyte solution to specific locations and combine them with hydrogen and hydroxide ions generated by splitting water to form acids and bases and a variety of other products without Redox electrode reactions. Therefore, the present invention can be used for various industrial processes of choice, including: (1) Manufacturing various chemicals whose constituents are ions or result from ions; (2) Desalination of seawater or brackish water and removal of hardness from water; and (3) Removal of ionic contamination of an electrolyte solution.

Test 3: The setup for test 3 was very similar to test 1. In this test it was intended to cause ion separation and recomposition between a caustic soda and copper sulfate solutions to form sodium sulfate and the precipitating copper hydroxide.

The active electrode IRC was filled with a nearly saturated solution of copper sulfate while the counter electrode IRC was filled with caustic soda solution with a PH of 13.0. Ion sinks were filled with distilled water. The electrodes used were ⅝-inch carbon electrodes described in the Equipment and Materials section, below. Using the potentiostat power supply in the chronopotentiometry mode, currents ranging from ±150 micro Amps to ±520 micro Amps were imposed in 60 second intervals for 22 hours. During this test, positive active electrode potentials (with respect to reference electrode) ranged from 3.5 to 6.5, while the negative voltages ranged from −4.0 to −2.5. At this time it was observed that a very visible precipitate with light blue color indicating the formation of copper hydroxide could be seen in one ion sink as expected while the solution in the other ion sink had clearly remained completely clear. These observations using a far less sensitive reaction as compared to reaction of chloride and silver ions reconfirm the capability of separation and recomposition of ions.

Test 4: For this test, the setup of FIG. 4 and its related operational procedure was used. Thus in the second phase, generation of hydrogen ions was also accomplished through electrolysis of water, using a sulfuric acid electrolyte. Individual IRCs were made up of 1 and ³⁄₁₆ inch OD transparent plastic tubes with the solution height of 170 millimeters. The electrode in the sodium chloride solution was a graphite-aerogel electrode with an OD of 10 mm and a length of 12 centimeters. The electrodes in the water splitting IRCs were ³⁄₁₆-inch stainless steel rods (grade 18.8). The Ion Sink containers were ¾-inch in diameter transparent plastic tubing, also with a solution height of 170 millimeters and were equipped with electrodes that were electrically connected to each other as well as to the reference port of the Potentiostat. Initially the ion sinks were filled with distilled water with a measured PH of 7.2. The active IRC contained a 2.7% solution of sodium chloride while the sodium hydroxide and sulfuric acid IRCS measured PH of 11.8 and 2.6 respectively. Each IRC was hydraulically connected to the Ion Sinks using total of 16 centimeters long natural rubber tubing with OD of 12 mm. The filter holders and pinch valves and their control system were as described earlier.

The power supplies used was a Gamry Reference 3000, controlled and operated through a Sony VAIO laptop computer. In this test the potentiostat was used in the chronopotentiometry mode in which the required currents were specified and the device automatically adjusted the potentials to achieve the required currents. The total duration of the test was 370 minutes.

Figure 9:
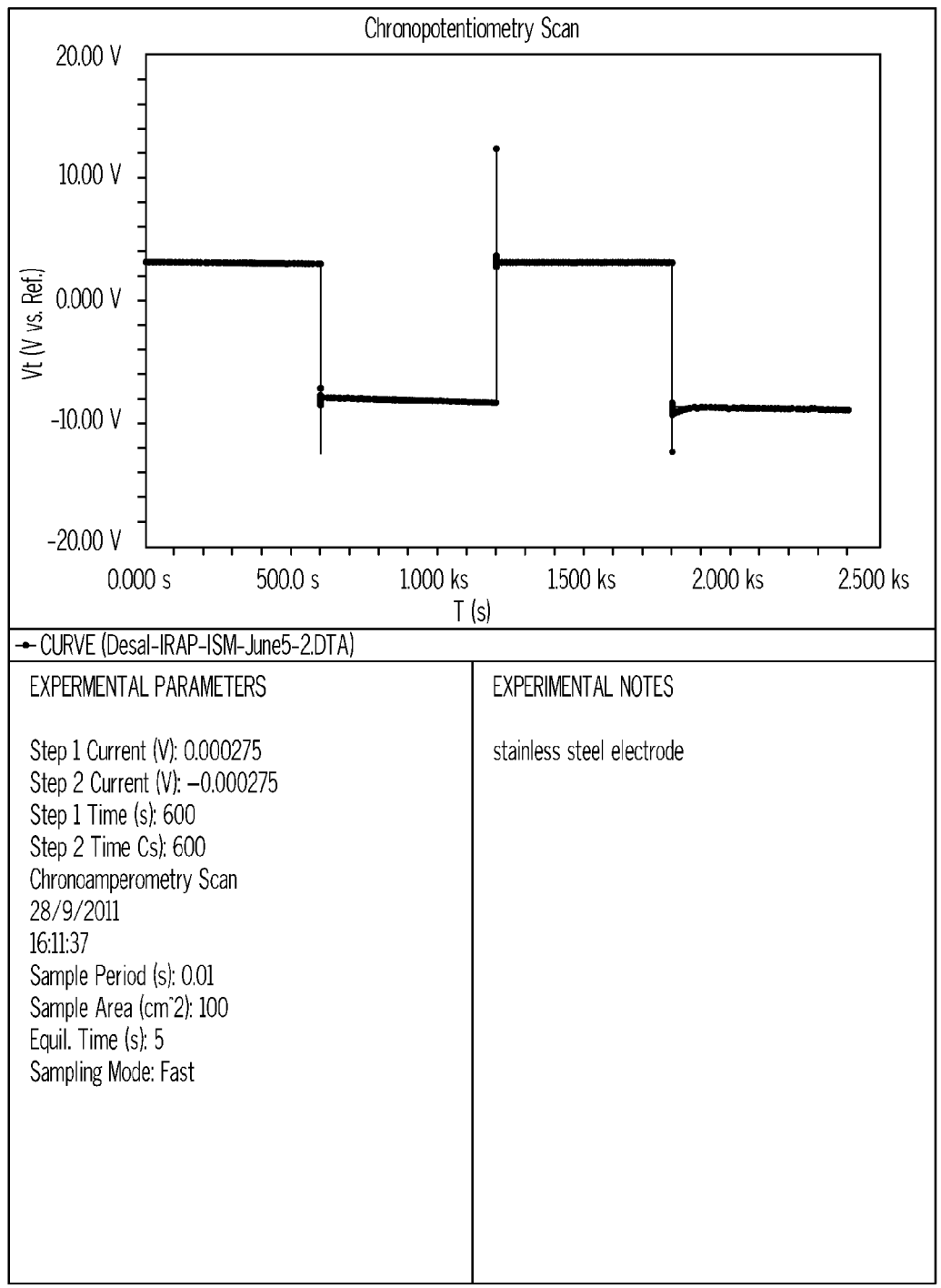
FIG. 9 illustrates representative data recorded during test 4.

Specified currents ranged from ±100 micro Amps to ±275 micro Amps applied in 600 second intervals of positive and 600 seconds of negative. As the test progressed, in each consecutive operation of two cycles of positive and two cycles of negative current imposed from the active electrode, the currents were gradually increased. An output file from this test is presented on FIG. 9 indicating an active electrode positive potential (with respect to reference electrode) of 3.1 Volts and a negative potential of 7.8 Volts. At the end of test, PH of in ion solution in the ion sink expected to accumulate positive sodium and negative hydroxide ions had increased to 10.7 while the PH in the ion sink expected to accumulate positive hydrogen ions and negative chlorine ions had dropped to 3.0. PH measurements were carried out using a carefully calibrated EUTECH Instruments pHTestr 10 PH measurement device.

Figure 10:
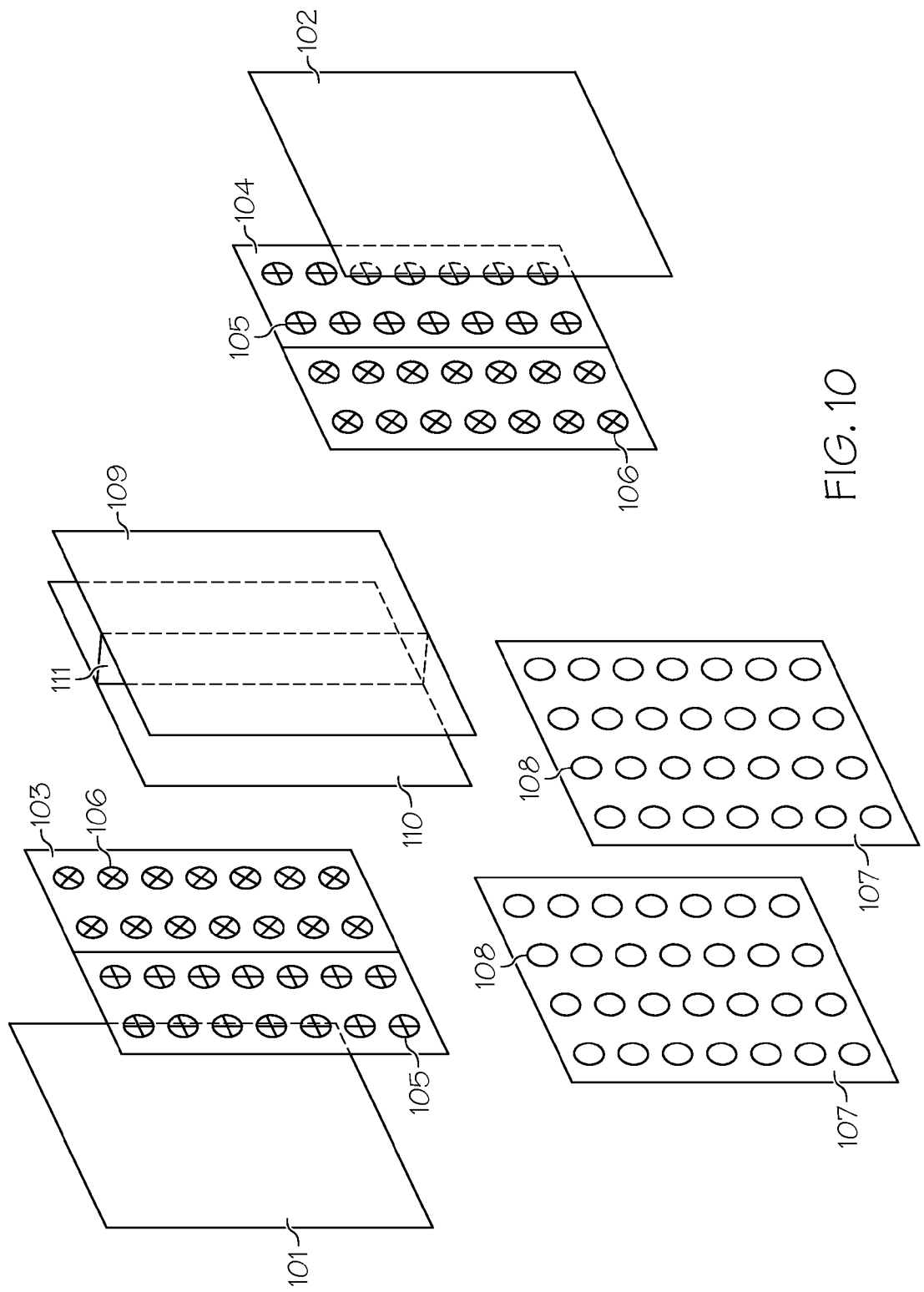
FIG. 10 illustrates a single cell preferred embodiment of this invention.

FIG. 10 presents an exploded view of one embodiment of the invention, in which high porosity carbon electrodes 101 and 102 are connected to the active poles of a current supply source (not shown) capable of generating electric currents of opposite polarity. These plates are to be closely positioned adjacent to exchange plates 103 and 104, which are made up of plastic type materials and have a number of holes as indicated. Each of the holes on plates 103 and 104 are covered by cation exchange membranes 105 or anion exchange membranes 106, as shown. There are also blocking plates 107 with holes 108 of similar size as the cation exchange membranes 105 and anion exchange membranes 106. The one set of holes 108 on plates 107 are positioned such that they perfectly coincide with either the cation exchange membranes 105 or anion exchange membranes 106, the remaining holes 108 are completely blocked by the space between the cation exchange membranes 105 or anion exchange membranes 106, and vice versa. There are also confined spaces 109 and 110 defined by the space between plates 107 and by a divider 111. The divider 111 is typically made of metal when the apparatus is powered by a potentiostat and is connected to the reference pole. But if the apparatus is powered by a current or voltage supply source, divider 111 should be made from non-conductive materials such as plastics. Typically, the metallic divider 111 is connected to the reference electrode of a potentiostat, the first high porosity carbon electrode 101 is connected to the active electrode of the potentiostat, the second high porosity carbon electrode 102 is connected to the counter electrode of the potentiostat. Electric connections are not shown.

The two plates 107 are attached to a mechanical apparatus (not shown) forcing them to move laterally in perfect synchronized movement with polarity reversals of electrodes 101 and 102. The arrangement shown in FIG. 10 is typically placed in a frame that seals the individual membranes and electrodes around the edges, preventing flow of ions and liquids from any location but the specified input and output paths. The apparatus thus described is typically 15 to 100 cm in height and 15 to 100 cm wide, with a total assembled thickness of about 10 to 20 mm. This assembly with holes of approximately 1.5 cm in diameter can function both as a desalination device and for application of ion separation and recomposition aspects of the present invention.

Another embodiment of this invention is presented in FIGS. 11a and 11b. FIG. 11a presents a three dimensional view of a stacked cell arrangement, and FIG. 11b presents the frontal view of the same cell. Here, all the parts identified with numerals equal to the ones identified on FIG. 10, refer to the same parts. In addition numerals 112 and 113 identify the compartments between each of the high capacitance electrodes and the ion exchange membrane closest to each electrode. The valve arrangements 107 and 108 of FIG. 10 are eliminated in the stacked cell arrangement of FIGS. 11a and 11b. This stacked cell arrangement can be used for desalination when the input solution is saline water or can be used for ion separation and recomposition when the two input solutions are different.

In the stacked cell arrangement of FIGS. 11a and 11b, sixteen compartments are defined between electrodes 101 and 102, fourteen of which are between ion exchange membranes and two compartments 112 and 113 are adjacent to electrodes 101 and 102 respectively. Of the fourteen compartments defined between ion exchange membranes, seven are in the front row and are totally separated from the seven compartments in the back row by spacer 111 (as shown in FIG. 11a). The sequence of membranes on one side of spacer 111 is indeed a 180 degree horizontal rotation of the sequence on the other side of spacer 111. There are also input and output passages leading in and out of each compartment which are not shown. These input and output passages are all equipped with control valves (also not shown) that regulate the flow of input and output solutions.

In practice, when electrode 101 is negatively charged by connecting it to the negatively charged pole of a direct current electric power source, (which is not shown) and electrode 102 is connected to the positive pole of the same direct current electric power source, an electric field will be invoked that has a direction that is shown at the bottom of FIG. 11a. Under this condition, one of the seven compartments in the back row is then emptied by means of the control valve on its output passage, while all the seven compartments in the front row are filled with solution. This emptied cell will then create an infinite electrical resistance through the back compartments. The established electric field that has been caused by capacitive behavior of electrode 101 within compartment 112 and electrode 102 within compartment 113, will cause positively charged ions to flow in the direction of the electric field and negatively charged ions to flow in the opposite direction within the front compartments. As positively charged ions are attracted to electrode 101 from the electrolyte within compartment 112, negatively charged ions are correspondingly attracted to electrode 102 within compartment 113. Thus, with this mode of operation, the electrode 101 and its adjacent compartment 112 and electrode 102 and its adjacent compartment 113, both act as ion collection cells.

Under this mode of operation positively and negatively charged ions will gradually move out of input compartments 114 and will concentrate in the output compartments 110 as positively charged ions are allowed to pass through cation exchange membranes (see FIG. 11a) and are prevented to flow through anion exchange membranes (also shown in FIG. 11a). Correspondingly, negatively charged ions are allowed to pass through anion exchange membranes and are prevented to flow through cation exchange membranes. As the potential between one or both of electrodes 101 and 102 and their adjacent electrolytes reach the level of initiating electrode reactions, or at any other convenient time before the start of electrode reactions, one of the compartments within the seven front compartments can be emptied to increase the electrical resistance through the front compartments to infinity and thus prevent further flow of ions through the front compartments. After this phase of operation, the polarity of the power supply is reversed, which reverses the polarity at electrodes 101 and 102. At the same time the empty cells in the back seven compartments are filled through the input passages. During this phase of polarity reversal, the direction of electric field between electrodes 101 and 102 will also reverse and will be as shown on the top of FIG. 11 a. This will lead to flow of positively charged ions towards electrode 102 and negatively charged ions towards electrode 101 and will once again lead to the concentration of ions in output compartments 109 and the depletion of ions from input compartments 115 both in the back row of compartments. As the potential between one or both of electrodes 101 and 102 and their adjacent electrolytes once again reach the level of initiating electrode reactions or at any other convenient time before start of this electrode reactions, the cycle is to be repeated.

Here it is also noted that the number of cation and anion exchange membrane pairs can be increased to accommodate more cells so long as it is commensurate with the other considerations such as the capability of the DC power supply source Further, it is also noted that with this arrangement, the polarity of charges supplied to electrodes in both the first half and the second half of the charging cycle can be reversed. In this case the electrodes and their related compartments will now act as Ion Repulsion Cells and the location of input and output compartments will also switch. This modification can be used to rejuvenate the Ion Exchange Membranes, if required.

Equipment and Materials

In the tests described herein, the following equipments and materials were used: The potentiostat used was a Reference 3000 Potentiostat manufactured by GAMRY Instruments Inc. of Pennsylvania, USA. This device can supply up to 3.0 Amperes of current to each electrode and had a maximum active electrode voltage of ±6.5 Volts. Ion Selective Membranes were supplied by Membranes International Inc. of New Jersey, USA. The anion exchange membranes were Model # AMI-7001S and cation exchange membranes were Model # CMI-7000S. Before each use the membranes were saturated for at least 24 hours in a solution similar to the one applied to them in tests. Membrane housings were 37 mm PVC Cassettes (used as inline filter holders) by SKC supplied by Concept Control Inc. of Calgary, Alberta, Canada. Flow cutoff valves were Transport Flow cutoff valves Model 10MM OD 12 VDC NC, Made in Japan, Cole-Palmer Catalogue No. 93305-10. Valve Control circuitry was designed and constructed by RMT Consultants of Okotoks, Alberta, Canada. This device was able to command the valves within a range of 0.1 to 10.0 Volts and −0.1 to −10.0 volts. Plastic Containers used were clear plastic tubing used in aquarium piping. Silver Nitrate, Sodium Chloride, copper sulfate, sodium hydroxide and sulfuric acid used were standard lab grade chemicals from Fisher Scientific. Flexible Tubing was standard laboratory natural rubber/latex tubing by Fisher Scientific. Titanium wires used were 1 mm in diameter and were taken from a coarse mesh sieve. Specific Gravity measurements were carried out with a CORALIFE Deep Six Hydrometer purchased from Big Al's aquarium store in Calgary, Alberta, Canada.

Two types of carbon electrodes were used. In the first, second and third tests electrodes were ⅜ in diameter solid carbon rods, commercially available under brand name of "Best Weld". The purchased rods were copper coated. The copper coating was removed by pealing it off before use. In test 4, the active electrode was a 10 mm in diameter graphite-aerogel composite electrode. These composites were prepared with the specific intention of allowing for the use of Resorcinol-Formaldehyde aerogels as the dominant phase in order to benefit from their high surface area, high electric capacitance and low electric resistance. Further and in order to avoid the complications and high cost associated with supercritical drying usually used to reduce the volume shrinkage associated with drying of such aerogels and aerogel composites and in order to further enhance their electric conductivity, graphite powder filler material was incorporated into the mix. The graphite powder fill used was laboratory grade #38 commercially available from Fisher Scientific, Canada.

The typical composition of aerogel base material used was 12.35 grams of resorcinol and 17.91 grams of 37% methane stabilized Formaldehyde and 20.0 grams of water which were mixed and stirred until the Resorcinol was totally dissolved. Then 1.12 grams of 0.1 Mole solution of sodium carbonate was added as catalyst.

The composite was then made using 50% by weight graphite powder detailed above and 50% aerogel base solution, also described above. The two materials were placed in a plastic bag and were extensively mixed by hand for about five minutes. For the purpose of building the rods, this composition was then placed in a transparent plastic pipe and was extensively tamped to drive out any trapped air.

The resulting components were then sealed using plastic caps and were allowed to cure for about 24 hours at room temperature followed by 24 hours at 50 degrees centigrade and 24 hours at 80 degrees, as is customary for RF aerogels. Curing was done while the constructed elements were still in the plastic tubes. In order to prevent distortion and bending of plastic tubes, they were covered by a relatively hard clay paste. Drying and hardening of these clay pastes prevented curvature and distortion of the plastic tubes and the composite in them. The tubes were then cooled to room temperature. The outer tubes were then cut open by a rotating blade.

After several hours of further drying at 50 and then 80 degrees centigrade, the components were placed in a refractory mold, covered with crushed carbon particles and were heated to 1200 degrees centigrade. This temperature was maintained for about 4 hours. After cooling to room temperature, the resulting rods were used.

While the present invention has been illustrated by the description of embodiments and examples thereof, it is not intended to restrict or in any way limit the scope of the appended claims to such detail. Additional advantages and modifications will be readily apparent to those skilled in the art. Accordingly, departures may be made from such details without departing from the scope or spirit of the invention.

What is claimed is:

1. A process for capacitive generation of ion streams, comprising:
    a) providing a first electrolyte solution in a first insulated container and a second electrolyte solution in a second insulated container, wherein each solution comprises an equal amount of positive ions and negative ions;
    b) separating the positive ions from the negative ions in each of the first and second electrolyte solutions by placing electrodes made of materials selected from the group consisting of activated carbon, carbon aerogel and carbon aerogel composites in each of the first and second electrolyte solutions and applying an electric voltage to the electrodes such that two capacitors in series are formed in each of the first and second electrolyte solutions;
    c) electrically drawing the ions out of each of the first and second solutions as positive and negative ion streams, wherein the positive and negative ion streams are generated in a continuous fashion and are selectively drawn through an ion selective membrane selective to the ion stream; and
    d) pooling the positive ion streams into a first ion sink and the negative ion streams into a second ion sink.

2. The process of claim 1, wherein the two capacitors in each of the first and second electrolyte solutions include an inner internal capacitor and an outer internal capacitor, the inner internal capacitor formed between the electrode and the ions collected on and in close proximity to the electrode, and the outer internal capacitor formed by the ions collected on the inner surface of the container and distributed charges in the outside environment, and wherein the formation of the outer internal capacitor leads to capacitive collection, concentration and voltage buildup of excess charges on the inner surface of the container.

3. The process of claim 1, the first electrolyte solution being different in composition than the second electrolyte solution, wherein the positive ion stream from the first solution and the negative ion stream from the second solution are pooled together into the first ion sink, and the negative ion stream from the first solution and the positive ion stream from the second solution are pooled together into the second ion sink, allowing for the formation of new chemical compounds in each of the ion sinks.

4. The process of claim 1, wherein both of the first and the second electrolyte solutions are one of sea water and brackish water, and wherein the process is used for desalination of the sea water or brackish water by the removal of both positively charged ions and negatively charged ions therefrom.

5. The process of claim 3, wherein the first electrolyte solution includes hydrated hydrogen ions and hydroxide ions generated by splitting water, and wherein the process is used to combine hydrated hydrogen ions generated from the first electrolyte solution with the negative ion stream generated from the second electrolyte solution in the first ion sink and to combine hydroxide ions generated from the first electrolyte solution with the positive ion stream generated from the second electrolyte solution in the second ion sink to form new chemicals including acids and bases.

6. The process of claim 1, wherein the process is used for industrial processes selected from the group consisting of:
  a) manufacturing chemicals whose constituents are ions;
  b) desalination of seawater or brackish water;
  c) removal of hardness from water; and
  d) removal of ionic contamination of an electrolyte solution.

\* \* \* \* \*